US009717015B2

(12) United States Patent
Soriaga et al.

(10) Patent No.: US 9,717,015 B2
(45) Date of Patent: Jul. 25, 2017

(54) RATE CONTROL FOR WIRELESS COMMUNICATION

(71) Applicant: QUALCOMM Incorporated, San Diego, CA (US)

(72) Inventors: Joseph Binamira Soriaga, San Diego, CA (US); Linhai He, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 14/480,125

(22) Filed: Sep. 8, 2014

(65) Prior Publication Data

US 2016/0007228 A1 Jan. 7, 2016

Related U.S. Application Data

(60) Provisional application No. 62/020,870, filed on Jul. 3, 2014.

(51) Int. Cl.
*H04L 12/26* (2006.01)
*H04J 3/14* (2006.01)
(Continued)

(52) U.S. Cl.
CPC ........ *H04W 28/0257* (2013.01); *H04B 1/123* (2013.01); *H04L 1/0002* (2013.01);
(Continued)

(58) Field of Classification Search
CPC . H04W 24/06; H04W 28/0257; H04W 88/06; H04W 72/087; H04W 28/12;
(Continued)

(56) References Cited

U.S. PATENT DOCUMENTS 8,837,479 B1 * 9/2014 Kumar ................ H04L 12/1877
370/228
2004/0213184 A1 10/2004 Hu et al.
(Continued)

FOREIGN PATENT DOCUMENTS

EP 1986365 A1 10/2008
EP 2077636 A1 7/2009
(Continued)

OTHER PUBLICATIONS

Partial International Search Report—PCT/US2015/035248—ISA/EPO—Aug. 19, 2013.
(Continued)

*Primary Examiner* — Alpus H Hsu
*Assistant Examiner* — Camquyen Thai

(57) ABSTRACT

Rate control is provided for communicating within a wireless communication network. In some examples, redundant packet information transmitted over separate links, each link having its own independent rate control loop, can result in improvement in packet reliability with fast convergence to a desired error level. In other examples, artificial degradation of a received data stream can be utilized to improve packet reliability, also with fast convergence to the desired error level.

20 Claims, 23 Drawing Sheets

(51) Int. Cl.
*H04L 1/14* (2006.01)
*H04W 28/02* (2009.01)
*H04W 88/06* (2009.01)
*H04W 72/08* (2009.01)
*H04W 28/12* (2009.01)
*H04L 1/00* (2006.01)
*H04B 1/12* (2006.01)
*H04L 1/08* (2006.01)
*H04W 72/04* (2009.01)
*H04L 1/04* (2006.01)
*H04L 1/06* (2006.01)
*H04L 1/18* (2006.01)

(52) U.S. Cl.
CPC .......... *H04L 1/0005* (2013.01); *H04L 1/0036* (2013.01); *H04L 1/08* (2013.01); *H04L 1/1845* (2013.01); *H04W 28/12* (2013.01); *H04W 72/0473* (2013.01); *H04W 72/087* (2013.01); *H04W 88/06* (2013.01); *H04L 1/0003* (2013.01); *H04L 1/04* (2013.01); *H04L 1/06* (2013.01); *H04L 1/1816* (2013.01); *H04L 1/1819* (2013.01)

(58) Field of Classification Search
CPC ....... H04L 1/123; H04L 7/02; H04L 12/1877; H04L 45/28; H04L 47/10; H04B 7/0413; H04B 10/27
USPC ........ 375/295, 260, 267, 299, 347; 370/216, 370/235, 238, 241, 252, 352, 400; 714/748, 749
See application file for complete search history.

(56) References Cited

U.S. PATENT DOCUMENTS

| | | | | |
|---|---|---|---|---|
| 2007/0177579 A1* | 8/2007 | Diethorn | ................. | H04L 45/24 370/352 |
| 2007/0242773 A1* | 10/2007 | Li | ........................... | H04L 1/002 375/299 |
| 2009/0241002 A1* | 9/2009 | Ko | ........................ | H04L 1/0009 714/749 |
| 2011/0249678 A1* | 10/2011 | Bonicatto | ............. | H04L 1/0003 370/400 |
| 2011/0267956 A1* | 11/2011 | Yonge, III | ............ | H04L 12/413 370/241 |
| 2012/0176922 A1 | 7/2012 | Ehasan et al. | | |
| 2014/0073313 A1 | 3/2014 | Hammarwall et al. | | |
| 2014/0086158 A1 | 3/2014 | Tavildar et al. | | |
| 2014/0105088 A1 | 4/2014 | Liu et al. | | |
| 2014/0105324 A1 | 4/2014 | Fan et al. | | |
| 2014/0126666 A1* | 5/2014 | Goldsmith | ........... | H04B 7/0413 375/295 |
| 2014/0133610 A1 | 5/2014 | Lee et al. | | |
| 2014/0169195 A1* | 6/2014 | Hsin | ................... | H04W 72/085 370/252 |
| 2014/0193161 A1* | 7/2014 | In De Betou | .......... | H04Q 11/00 398/154 |
| 2014/0313902 A1* | 10/2014 | Bruner | .............. | H04W 28/0236 370/238 |

FOREIGN PATENT DOCUMENTS

WO    WO-2005078976 A1    8/2005
WO    WO-2009137102 A2    11/2009

OTHER PUBLICATIONS

International Search Report and Written Opinion—PCT/US2015/035248—ISA/EPO—Nov. 4, 2015.
Yazdani M., et al., "On construction of rate-compatible low-density parity-check codes" Proc., IEEE International Conference on Communications, ICC 2004, Paris, France, Jun. 20, 2004-Jun. 24, 2004 (Jun. 24, 2004) pp. 430-434, XP010710382.

* cited by examiner

RATE CONTROL FOR WIRELESS COMMUNICATION

CROSS-REFERENCE TO RELATED APPLICATION(S)

This application claims priority to and the benefit of provisional patent application No. 62/020,870 filed in the U.S. patent office on Jul. 3, 2014, the entire content of which is incorporated herein by reference.

BACKGROUND

Field of the Disclosure

Aspects of the disclosure relate generally to wireless communication, and more specifically, but not exclusively, to rate control loops that can achieve high packet reliability with good spectral efficiency.

Description of Related Art

Wireless communication networks are widely deployed to provide various communication services such as telephony, video, data, messaging, broadcasts, and so on. Such networks, which are usually multiple access networks, support communications for multiple users by sharing the available network resources. As the demand for mobile broadband access continues to increase, research and development continue to advance wireless communication technologies not only to meet the growing demand for mobile broadband access, but to advance and enhance the user experience.

Wireless devices in a network may adapt the modulation and coding used for wireless transmissions on a given channel in an attempt to efficiently use communication resources in view of interference, channel fading, and other factors. For example, if a high packet error rate is observed through the use of a feedback mechanism, the wireless devices may select a different coding rate for subsequent transmissions. Here, the frequency with which the coding rate is adapted depends on the frequency with which error feedback is received.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

Various aspects of the present disclosure provide for communicating within a wireless communication network. In some examples, redundant packet information transmitted over separate links, each link having its own independent rate control loop, can result in dramatic improvement in packet reliability with fast convergence to a desired error level. In other examples, artificial degradation of a received data stream can be utilized to improve packet reliability, also with fast convergence to the desired error level. Thus, through the use of the disclosed techniques, more reliable and lower latency communication may be achieved.

In one aspect, the disclosure provides a method for wireless communication including transmitting a first packet stream on a first link; transmitting a second packet stream on a second link, the second packet stream comprising information that is redundant of information transmitted on the first packet stream; implementing rate control on the first link; and implementing rate control on the second link, wherein the rate control on the first link is independent of the rate control on the second link and the rate control on the second link is independent of the rate control on the first link.

Another aspect of the disclosure provides an apparatus configured for wireless communication. The apparatus including means for transmitting a first packet stream on a first link; means for transmitting a second packet stream on a second link, the second packet stream comprising information that is redundant of information transmitted on the first packet stream; means for implementing rate control on the first link; and means for implementing rate control on the second link, wherein the rate control on the first link is independent of the rate control on the second link and the rate control on the second link is independent of the rate control on the first link.

Another aspect of the disclosure provides an apparatus for wireless communication that includes at least one processor and a memory coupled to the at least one processor. The at least one processor is configured to transmit a first packet stream on a first link; transmit a second packet stream on a second link, the second packet stream comprising information that is redundant of information transmitted on the first packet stream; implement rate control on the first link; and implement rate control on the second link, wherein the rate control on the first link is independent of the rate control on the second link and the rate control on the second link is independent of the rate control on the first link.

Another aspect of the disclosure provides a computer-readable medium storing computer-executable code, comprising code to transmit a first packet stream on a first link; code to transmit a second packet stream on a second link, the second packet stream comprising information that is redundant of information transmitted on the first packet stream; code to implement rate control on the first link; and code to implement rate control on the second link, wherein the rate control on the first link is independent of the rate control on the second link and the rate control on the second link is independent of the rate control on the first link.

In one aspect, the disclosure provides a method for wireless communication including receiving a packet stream comprising a plurality of packets; applying an artificial degradation to the received packet stream; decoding the artificially degraded packet stream; applying an integrity check to the decoded artificially degraded packet stream; and transmitting at least one response indicating success or failure of the integrity check.

Another aspect of the disclosure provides an apparatus configured for wireless communication. The apparatus including means for receiving a packet stream comprising a plurality of packets; means for applying an artificial degradation to the received packet stream; means for decoding the artificially degraded packet stream; means for applying an integrity check to the decoded artificially degraded packet stream; and means for transmitting at least one response indicating success or failure of the integrity check.

Another aspect of the disclosure provides an apparatus for wireless communication that includes at least one processor and a memory coupled to the at least one processor. The at least one processor is configured to receive a packet stream comprising a plurality of packets; apply an artificial degradation to the received packet stream; decode the artificially degraded packet stream; apply an integrity check to the decoded artificially degraded packet stream; and transmit at least one response indicating success or failure of the integrity check.

Another aspect of the disclosure provides a computer readable medium storing computer executable code, comprising code to receive a packet stream comprising a plurality of packets; code to apply an artificial degradation to the received packet stream; code to decode the artificially degraded packet stream; code to apply an integrity check to the decoded artificially degraded packet stream; and code to transmit at least one response indicating success or failure of the integrity check.

In one aspect, the disclosure provides a method for wireless communication including receiving packet streams over different packet links; transmitting feedback over the different links; and providing output packets based on the received packet streams.

Another aspect of the disclosure provides an apparatus configured for wireless communication. The apparatus including means for receiving packet streams over different packet links; means for transmitting feedback over the different links; and means for providing output packets based on the received packet streams.

Another aspect of the disclosure provides an apparatus for wireless communication that includes at least one processor and a memory coupled to the at least one processor. The at least one processor is configured to receive packet streams over different packet links; transmit feedback over the different links; and provide output packets based on the received packet streams.

Another aspect of the disclosure provides a computer readable medium storing computer executable code, comprising code to receive packet streams over different packet links; code to transmit feedback over the different links; and code to provide output packets based on the received packet streams.

In one aspect, the disclosure provides a method for wireless communication including transmitting a packet stream comprising a plurality of packets on a wireless link; receiving feedback indicating a success or failure of an integrity check applied to a degraded version of the plurality of packets; and implementing rate control on the wireless link in accordance with the feedback.

Another aspect of the disclosure provides an apparatus configured for wireless communication. The apparatus including means for transmitting a packet stream comprising a plurality of packets on a wireless link; means for receiving feedback indicating a success or failure of an integrity check applied to a degraded version of the plurality of packets; and means for implementing rate control on the wireless link in accordance with the feedback.

Another aspect of the disclosure provides an apparatus for wireless communication that includes at least one processor and a memory coupled to the at least one processor. The at least one processor is configured to transmit a packet stream comprising a plurality of packets on a wireless link; receive feedback indicating a success or failure of an integrity check applied to a degraded version of the plurality of packets; and implement rate control on the wireless link in accordance with the feedback.

Another aspect of the disclosure provides a computer readable medium storing computer executable code, comprising code to transmit a packet stream comprising a plurality of packets on a wireless link; code to receive feedback indicating a success or failure of an integrity check applied to a degraded version of the plurality of packets; and code to implement rate control on the wireless link in accordance with the feedback.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

Figure 1:
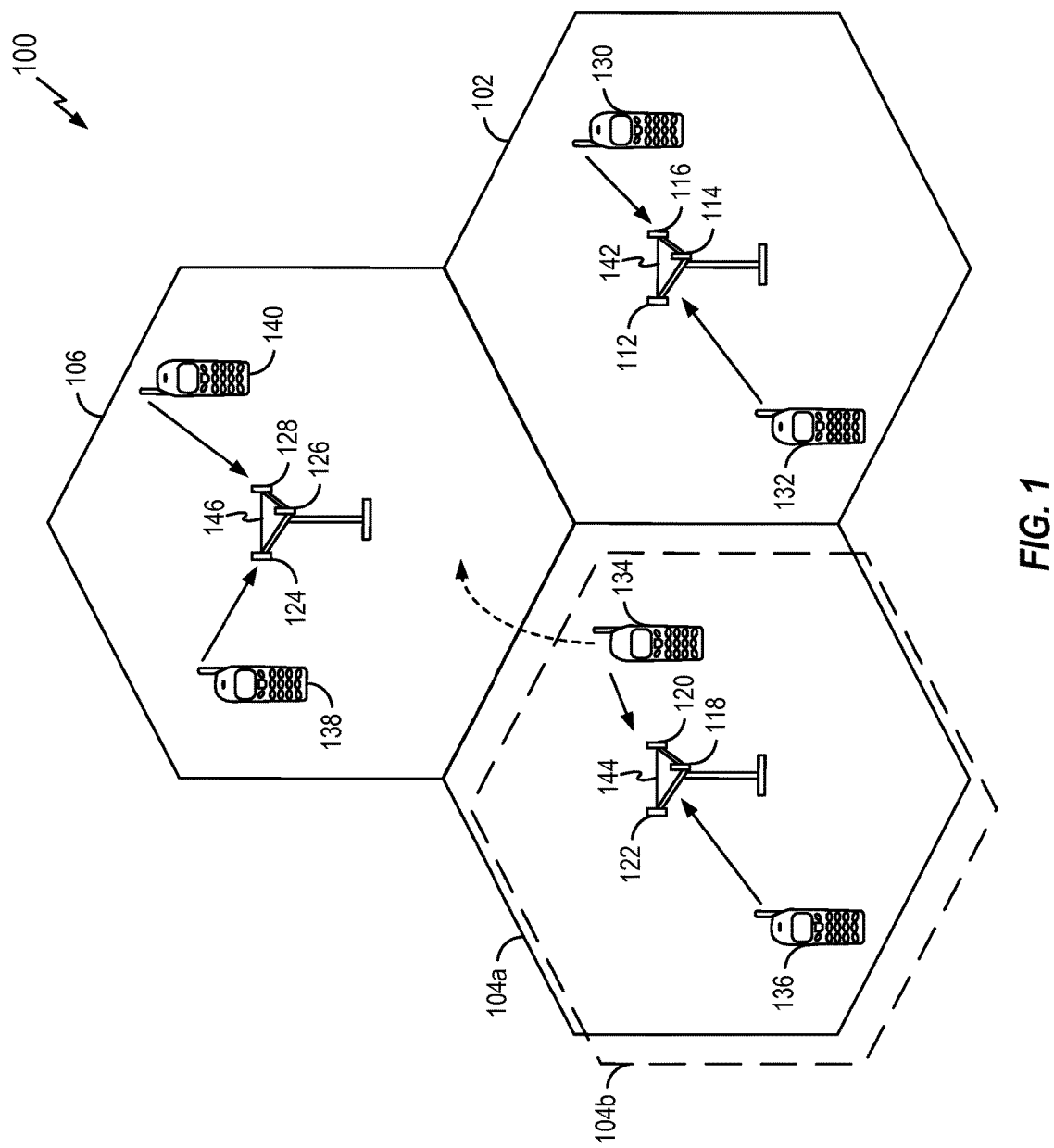
FIG. 1 is a block diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, a simplified access network 100 is shown. The access network 100 can be implemented according to various network technologies including, without limitation, fifth generation (5G) mobile phone technology, fourth generation (4G) mobile phone technology, third generation (3G) mobile phone technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in cell 102, antenna groups 112, 114, and 116 may each correspond to a different sector. In cell 104, antenna groups 118, 120, and 122 may each correspond to a different sector. In cell 106, antenna groups 124, 126, and 128 may each correspond to a different sector.

The cells 102, 104, and 106 may include several access terminals (ATs) that may be in communication with one or more sectors of each cell 102, 104, or 106. For example, ATs 130 and 132 may be in communication with an access point (AP) 142, ATs 134 and 136 may be in communication with an AP 144, and UEs 138 and 140 may be in communication with an AP 146. In various implementations, an AP may be referred to or implemented as a base station, a NodeB, an eNodeB, and so on; while an AT may be referred to or implemented as a user equipment (UE), a mobile station, and so on.

Figure 2:
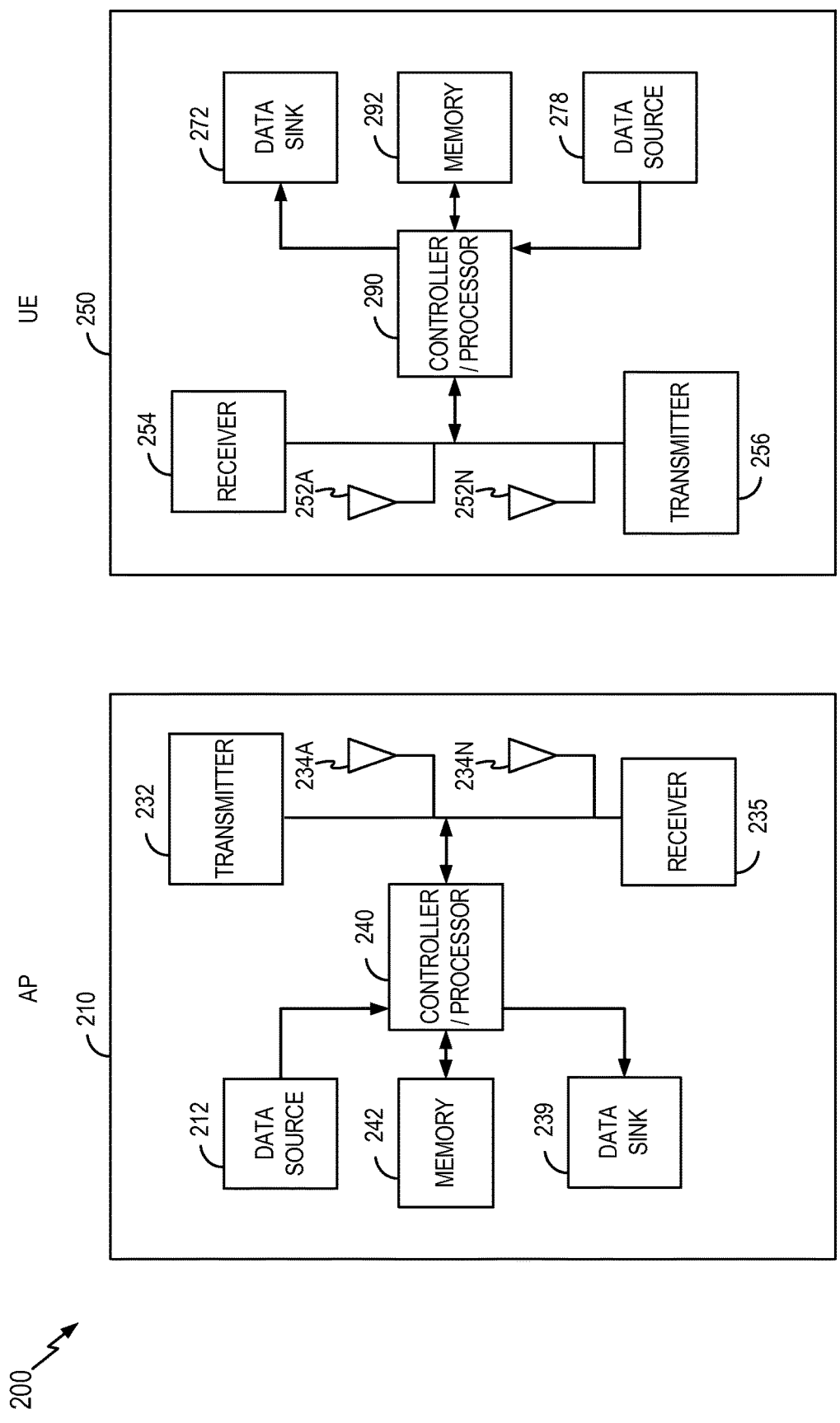
FIG. 2 is a block diagram illustrating an example of an access terminal in communication with an access point in a communication system according to some aspects of the disclosure.

FIG. 2 is a block diagram of system 200 including an access point (AP) 210 in communication with a UE 250, where the AP 210 and the UE 250 may be configured to provide functionality as taught herein. The AP 210 may be the AP 142, 144, or 146 in FIG. 1, and the UE 250 may be the UE 130, 132, 134, 136, 138, or 140 in FIG. 1. In various operating scenarios, the AP 210 and/or the AT 250 may be a transmitter or transmitting device, or a receiver or receiving device, or both. Examples of such transmitters, transmitting devices, receivers, and receiving devices are illustrated in FIGS. 3, 4, 6, 8, 11, 13, 17, 19, and 22.

In a downlink communication from the AP 210 to the UE 250, a controller or processor 240 may receive data from a data source 212. Channel estimates may be used by a controller/processor 240 to determine the coding, modulation, spreading, and/or scrambling schemes for the transmit processor 220. These channel estimates may be derived from a reference signal transmitted by the UE 250 or from feedback from the UE 250. A transmitter 232 may provide various signal conditioning functions including amplifying, filtering, and modulating frames onto a carrier for downlink transmission over a wireless medium through antennas 234A-234N. The antennas 234A-234N may include one or more antennas, for example, including beam steering bidirectional adaptive antenna arrays, MIMO arrays, or any other suitable transmission/reception technologies.

At the UE 250, a receiver 254 receives the downlink transmission through antennas 252A-252N (e.g., representing one or more antennas) and processes the transmission to recover the information modulated onto the carrier. The information recovered by the receiver 254 is provided to a controller/processor 290. The processor 290 descrambles and despreads the symbols, and determines the most likely signal constellation points transmitted by the AP 210 based on the modulation scheme. These soft decisions may be based on channel estimates computed by the processor 290. The soft decisions are then decoded and deinterleaved to recover the data, control, and reference signals. The CRC codes are then checked to determine whether the frames were successfully decoded. The data carried by the successfully decoded frames will then be provided to a data sink 272, which represents applications running in the UE 250 and/or various user interfaces (e.g., display). Control signals carried by successfully decoded frames will be provided to a controller/processor 290. When frames are unsuccessfully decoded, the controller/processor 290 may also use an acknowledgement (ACK) and/or negative acknowledgement (NACK) protocol to support retransmission requests for those frames.

In the uplink from the UE 250 to the AP 210, data from a data source 278 and control signals from the controller/processor 290 are provided. The data source 278 may represent applications running in the UE 250 and various user interfaces (e.g., keyboard). Similar to the functionality described in connection with the downlink transmission by the AP 210, the processor 290 provides various signal processing functions including CRC codes, coding and interleaving to facilitate FEC, mapping to signal constellations, spreading with OVSFs, and scrambling to produce a series of symbols. Channel estimates, derived by the processor 290 from a reference signal transmitted by the AP 210 or from feedback contained in a midamble transmitted by the AP 210, may be used to select the appropriate coding, modulation, spreading, and/or scrambling schemes. The symbols produced by the processor 290 will be utilized to create a frame structure. The processor 290 creates this frame structure by multiplexing the symbols with additional information, resulting in a series of frames. The frames are then provided to a transmitter 256, which provides various signal conditioning functions including amplification, filtering, and modulating the frames onto a carrier for uplink transmission over the wireless medium through the antennas 252A-252N.

The uplink transmission is processed at the AP 210 in a manner similar to that described in connection with the receiver function at the UE 250. A receiver 235 receives the uplink transmission through the antennas 234A-234N and processes the transmission to recover the information modulated onto the carrier. The information recovered by the receiver 235 is provided to the processor 240, which parses each frame. The processor 240 performs the inverse of the processing performed by the processor 290 in the UE 250. The data and control signals carried by the successfully decoded frames may then be provided to a data sink 239. If some of the frames were unsuccessfully decoded by the receive processor, the controller/processor 240 may also use a positive acknowledgement (ACK) and/or negative acknowledgement (NACK) protocol to support retransmission requests for those frames.

The controller/processors 240 and 290 may be used to direct the operation at the AP 210 and the UE 250, respectively. For example, the controller/processors 240 and 290 may provide various functions including timing, peripheral interfaces, voltage regulation, power management, and other control functions. The computer readable media of memories 242 and 292 may store data and software for the AP 210 and the UE 250, respectively.

In accordance with various aspects of the disclosure, an element, or any portion of an element, or any combination of elements may be implemented with controller/processors 240 and 290 (e.g., that may each include one or more processors). The controller/processors 240 and 290 are responsible for general processing, including the execution of software stored in the memory 242 or 292. The software, when executed by the controller/processors 240 and 290, causes the controller/processors 240 and 290 to perform the various functions described below for any particular apparatus. The memory 242 or 292 may also be used for storing data that is manipulated by the controller/processors 240 and 290 when executing software.

In various aspects of the disclosure, an apparatus may be utilized in a wireless communication network, as a scheduling entity (e.g., the AP 210) and/or as a non-scheduling or subordinate entity (e.g., the UE 250). In any case, the apparatus may communicate with one or more wireless entities over an air interface. In any wireless communication network, channel conditions corresponding to the air interface will change over time.

Many networks accordingly use one or more rate control loops to dynamically adapt to the channel. For example, a transmitting device may configure one or more transmission parameters, including but not limited to a modulation and coding scheme (MCS), a transmission power, etc., to target a desired error rate at the receiving device. The receiving device that is receiving a packet-switched data stream typically checks the integrity of packets (e.g., using a cyclic redundancy check or CRC, a checksum, PHY layer channel coding pass/fail status, etc.) and may report back to the transmitting device using an acknowledgment or non-acknowledgment. This integrity check and reporting frequently, though not always, takes the form of an automatic repeat request (ARQ) and/or hybrid automatic repeat request (HARQ) algorithm. In other examples, any suitable algorithm or means of providing feedback information or response transmissions from the receiving device to the transmitting device may be used, such as reports relating to channel quality.

Figure 3:
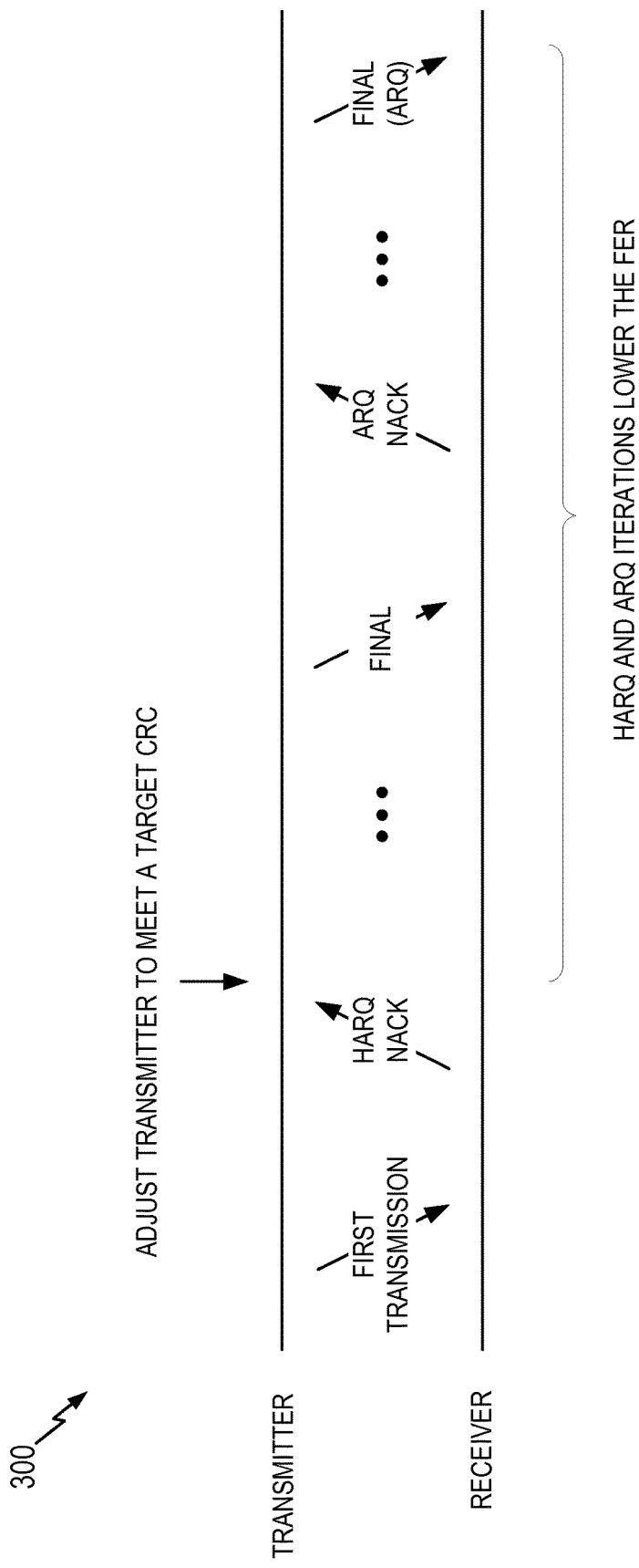
FIG. 3 is a flow diagram illustrating an example of an HARQ/ARQ algorithm as it might be utilized between a transmitter and receiver.

FIG. 3 is a flow diagram 300 illustrating an HARQ/ARQ algorithm as it might be utilized between a transmitting device (referred to, for convenience, as a transmitter) and receiving device (referred to, for convenience, as a receiver) in accordance with some examples. In an ARQ or HARQ algorithm, as illustrated in FIG. 3, the reporting is typically a positive acknowledgment (ACK) or a negative acknowledgment (NACK). In the case of a HARQ NACK, the transmitting device may adjust one or more operating parameters (e.g., MCS, transmission power, etc.) to meet a target CRC failure rate. In the case of a NACK or a missing response, the transmitting device may retransmit the packet or another portion of the packet in an incremental redundancy setup.

This response-retransmission scheme provides for improved reliability (in terms of a low frame error rate) in packet transmission. In particular, iterations of HARQ and ARQ operations can be used to lower the frame error rate (FER) seen on the link. However, such a response-retransmission scheme contributes to increased latency. In particular, when the channel conditions are poor, several rounds of retransmission are typically performed. The resulting latency can substantially affect the user experience.

High error rates can be addressed at the transmitting device by using any one or more of various schemes, such as using a more robust modulation and coding scheme (MCS), increasing the transmission power, etc. Some existing schemes use techniques such as those described above to target a CRC failure rate in the range of 1-10% after the first transmission (i.e., the failure of the first packet prior to any retransmission). There may be a desire in some systems to reduce the CRC failure rate to very low values, e.g., less than 0.5%. However, in such a case, error events are very rare, and accordingly, feedback from the receiving device that gives useful information to the transmitting device about the channel is also very rare. This can cause poor use of channel resources, and very slow convergence to a desired CRC failure rate. For example, if channel conditions are initially very poor, the MCS and/or transmit power may be set to a very robust setting, e.g., with substantial redundancy. If channel conditions improve, a less robust MCS and/or a lower transmit power might suffice, but due to the infrequent feedback from the receiving device, any change to a more suitable MCS/power could be slow to converge.

Accordingly, in various aspects of the present disclosure, a number of spectrally efficient approaches are disclosed for reducing or removing the multiple rounds of HARQ/ARQ ACK/NACK feedback, while still enabling the achievement of high reliability and low frame error rates on the first transmission. As described in further detail below, some aspects of the disclosure provide for the use of multiple (e.g., two or more) rate control loops each configured to track at a relatively high failure rate, but by acting together, can achieve the desired low overall failure rate. In some examples, a single data stream may be encoded across the multiple independent rate control loops, while in other examples, the multiple independent rate control loops may correspond to separate data streams. In other aspects of the disclosure, rate control may utilize an artificial degraded channel to achieve a low CRC failure rate, such that the transmitting device may configure the transmission scheme according to a higher CRC failure rate, controlled by the amount of artificial degradation.

Multiple Independent Rate Control Loops

In some aspects of the disclosure, two or more links (e.g., redundant links) may be utilized to transmit a packet stream. In various examples, the separate links may be transmitted on separate bands or antennas, although in other examples, the links may utilize the same band and/or the same antenna. In some examples, the bands are sufficiently separated in frequency so as to provide a specific level of fade diversity. As utilized in the present disclosure, a link refers to a stream of packets transmitted by a transmitting device, wherein the stream or link is under the control of a rate control loop or algorithm. That is, each link has a corresponding CRC or other suitable integrity check, and its own ACK/NACK or other suitable response mechanism. For example, the power/MCS of each link may be configured to target a suitable CRC failure rate (e.g., 10%), which may be determined in accordance with the received feedback or responses (ACK/NACK transmissions).

In an aspect of the present disclosure, the rate control loops for two or more links transmitted by a transmitting device may be independent of one another. That is, each link may include its own integrity check mechanism, such as a CRC calculated corresponding to the packets transmitted on that link, independent of any other link or links. Furthermore, each link may include its own response or feedback mechanism, determined in accordance with the integrity check for that particular link, independent of any other link or links.

Figure 4:
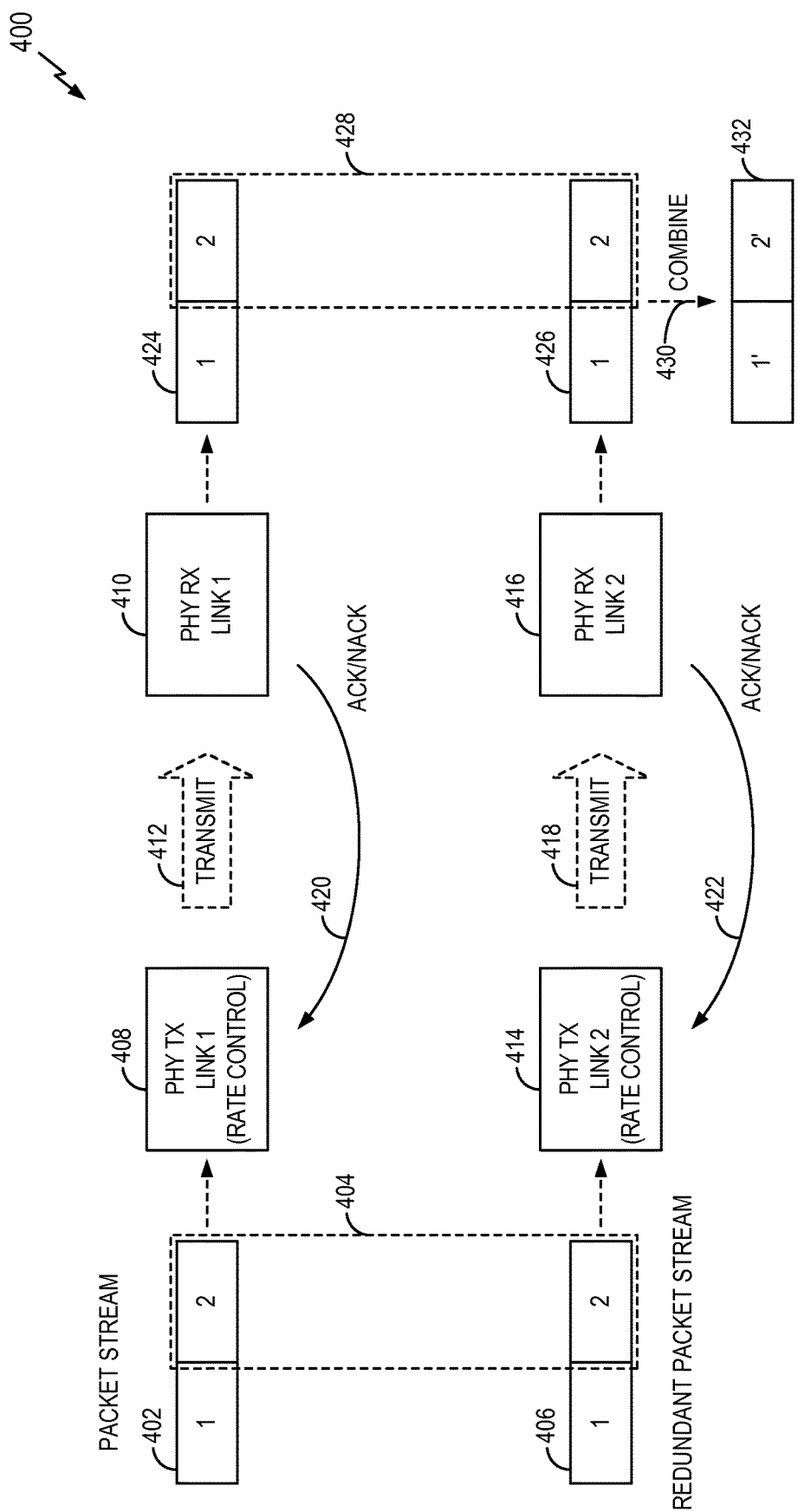
FIG. 4 is an illustration of an example of two links with independent rate control loops as they may be implemented in accordance with some aspects of the disclosure.

By utilizing multiple independent rate control links, in various aspects of the disclosure, an overall probability of failure can be made to be very low. For example, FIG. 4 is a schematic illustration 400 of two links with independent rate control loops as they may be implemented in accordance with some aspects of the disclosure. Here, the two links are utilized to transmit redundant information, e.g., wherein the same information, or same packets, are transmitted on each stream, with independent rate control loops being utilized. In the illustrated scheme, one or more characteristics of the transmission of each link, such as an MCS and/or a transmit power, may be set with an aim to have a probability of failure of each packet at 10%. However, according to an aspect of the present disclosure, by virtue of the transmission of each packet in a redundant fashion on the two links, the combined probability of failure of the same packet on both streams is $(10\%)^2=1\%$. Of course, a trade-off of this scheme is that the link efficiency is reduced in half by using two redundant links (in other words, twice the bandwidth may be utilized for the same amount of information), but an order of magnitude lower error rate is achieved. More broadly, with any number of links with independent rate control loops, and with configurable error rates on each of the links, the trade-off may be seen as a geometric increase in the bandwidth used, in exchange for an exponential increase in packet reliability. That is, the scheme described above can of course be used with any number of redundant links, with the corresponding trade-offs between link efficiency and probability of failure.

In the simplified example of FIG. 4, a first packet stream 402 includes two packets (designated 1 and 2). Packets of the first packet stream 402 are duplicated (as represented by a dashed block 404) to provide a second packet stream 406 that includes the two packets (designated 1 and 2). Thus, in some aspects, the second packet stream 406 is a redundant packet stream relative to the first packet stream 402.

A physical layer transmitter (PHY TX) 408 for the first link transmits the first packet stream 402 to a physical layer receiver (PHY RX) 410 for the first link as represented by the transmit symbol 412. In addition, a physical layer transmitter (PHY TX) 414 for the second link transmits the second packet stream 406 to a physical layer receiver (PHY RX) 416 for the second link as represent by the transmit symbol 418.

As mentioned above, the first and second links independently implement rate control. As illustrated in FIG. 4, the PHY receiver 410 transmits ACK/NACK information 420 for the first link to the PHY transmitter 408, while the PHY receiver 416 transmits ACK/NACK information 422 for the second link to the PHY transmitter 414. Thus, each link can adjust transmit power and/or MCS independent to meet a target CRC failure rate (e.g., 10%).

Each of the PHY receivers outputs an independently decoded (with respect to the other link) packet stream. Specifically, the PHY receiver 410 outputs a first packet stream 424, while the PHY receiver 416 outputs a second packet stream 426. As represented by a dashed block 428, the second packet stream 426 is a duplicate of the first packet stream 424 in this example. Thus, any packet stream that passes an integrity check (e.g., CRC, etc.) may be output as valid received data. It should be appreciated that the probability that at least one of the packet streams passes an integrity check is much higher than the probability that a give one of the packet streams passes its integrity check. For example, the combined failure rate may be the product of the respective failure rates on the links (e.g., 0.1*0.1=0.01, or 1%).

As discussed in more detail below, in some scenarios, neither of the decoded packets streams will pass the integrity check. However, as represented by a line 430, the first and second packet streams 424 and 426 may be combined in an attempt to recover valid data from these streams. Thus, in practice, the actual error rate may be even lower (e.g., less than 1%) since it may be possible to recover a valid packet stream 432 even when the packet stream on each link fails its respective integrity check.

Figure 5:
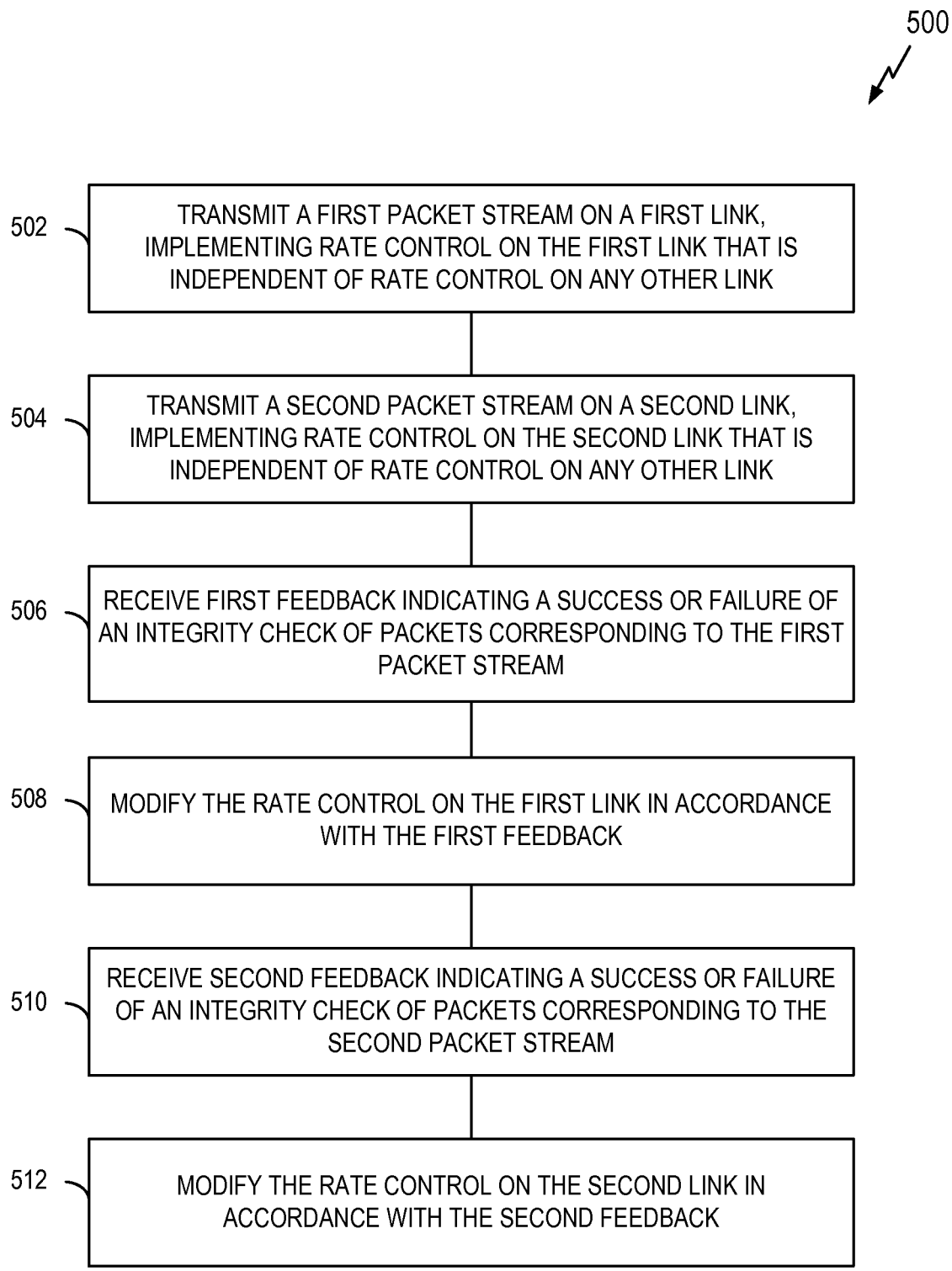
FIG. 5 is a flowchart illustrating an example of a process of transmitting on a plurality of links with independent rate control loops in accordance with some aspects of the disclosure.

FIG. 5 is a flowchart illustrating a process 500 of transmitting a plurality of links with independent rate control loops in accordance with some aspects of the disclosure. Thus, in some aspects, the process 500 may be construed as being performed by a transmitting device (or transmitter). The terms transmitting device or transmitter indicate that a particular device is performing transmit operations. It should be appreciated that such a device may also be capable of performing receive operations.

The process 500 may take place within a processor/controller 240 or 290 (FIG. 2), which may be located at an AP, a UE, or some other suitable apparatus. In another aspect, the process 500 may be implemented by any of the UEs 130-140 or any of the APs 142-146 illustrated in FIG. 1. Of course, in various aspects within the scope of the present disclosure, the process 500 may be implemented by any suitable apparatus capable of supporting independent rate control operations on multiple links.

At block 502, an apparatus transmits a first packet stream on a first link. The apparatus may further implement rate control on the first link, wherein the rate control on the first link is independent of the rate control on any other link.

At block 504, the apparatus transmits a second packet stream on a second link. The second packet stream includes duplicate packets to packets transmitted on the first packet stream. The apparatus may further implement rate control on the second link, wherein the rate control on the second link is independent of the rate control on the first link.

At block 506, the apparatus receives first feedback indicating a success or failure of an integrity check of packets corresponding to the first packet stream. Accordingly, at block 508, the apparatus may modify the rate control on the first link in accordance with the first feedback.

Similarly, at block 510, the apparatus receives second feedback indicating a success or failure of an integrity check of packets corresponding to the second packet stream. Accordingly, at block 512, the apparatus may modify the rate control on the second link in accordance with the second feedback.

Figure 6:
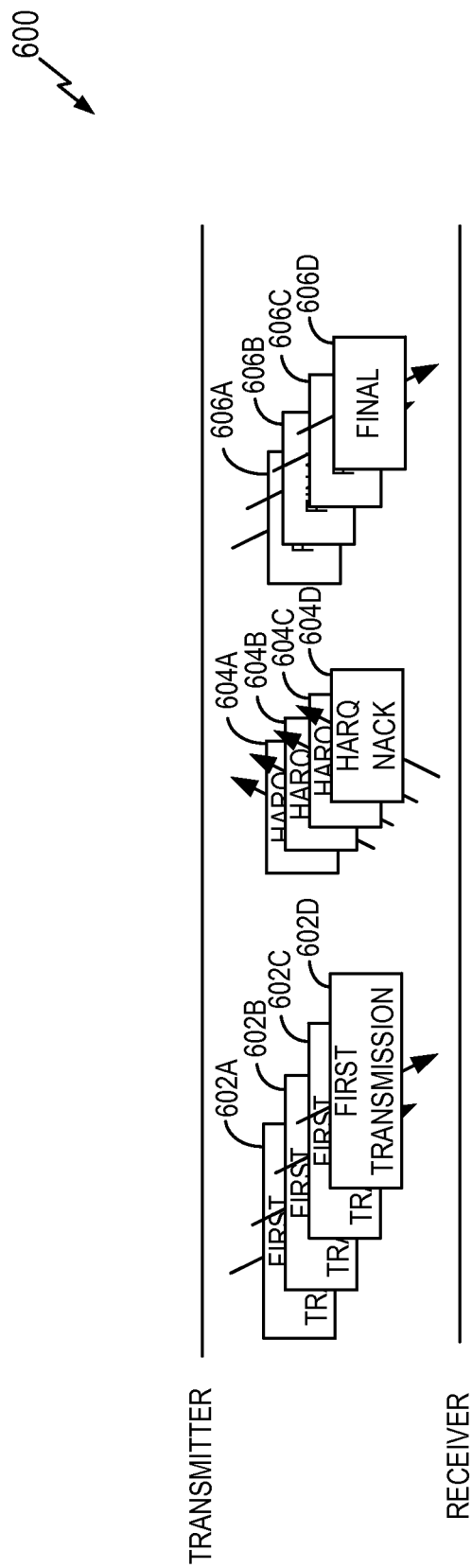
FIG. 6 is a diagram illustrating an example of a scheme for the collapse of ACK/NACK feedback for a plurality of links with independent rate control loops, as it may be implemented in accordance with some aspects of the disclosure.

In a further aspect of the disclosure, the ACK/NACK feedback from the receiving device may be collapsed, e.g., into a single transmission. For example, FIG. 6 is a schematic diagram 600 illustrating a scheme for the collapse of ACK/NACK feedback for a plurality of links with independent rate control loops, as it may be implemented in accordance with some aspects of the disclosure. In the illustration, the transmitter transmits a packet, illustrated as a first transmission, four times utilizing four separate links with independent rate control loops. Accordingly, four instances 602A, 602B, 602C, and 602D of the first transmission are indicated in FIG. 6.

The receiver attempts to receive and decode the packet on each of the four links, and determines whether the received packets pass an integrity check (e.g., a CRC). In accordance with the status of the integrity check, the receiver may generate an ACK/NACK corresponding to each of the four packets. Thus, FIG. 6 illustrates four potential instances 604A, 604B, 604C, and 604D of HARQ NACKs for the four instances 602A, 602B, 602C, and 602D of the first transmission, respectively. In addition, FIG. 6 illustrates four potential instances 606A, 606B, 606C, and 606D of final data corresponding to the four instances 602A, 602B, 602C, and 602D of the first transmission and associated instances 604A, 604B, 604C, and 604D of potential HARQ operations, respectively.

In an aspect of the present disclosure, a NACK or other suitable request for retransmission of a packet might only be transmitted from the receiver to the transmitter when a particular packet fails to be properly decoded on each of the multiple links (e.g., all four links). In another example, the ACK/NACK feedback from the receiver might be sent for each link independently, but the transmitting device might only retransmit a packet when all links indicate a NACK, or otherwise indicate that decoding of the packet failed on all links. In such an example, the retransmitted packet may be sent on one or more of the links.

Accordingly, in either of the above examples, the transmitting device might only retransmit a packet in the case that all of the redundant links failed their respective integrity check for that particular packet. In this way, even though the transmitting device may continue to adjust each packet stream for, say, the 10% CRC failure rate, the transmitter might only retransmit much fewer than 10% of the packets. Particularly, in the illustrated example wherein four redundant links are adjusted for 10% CRC failures, an overall error rate of $(10\%)^4$ would mean that only approximately 0.01% of the packets would be retransmitted, since overall only 0.01% of the packets will simultaneously fail on all four streams.

Moreover, this low error rate can be achieved in less time as compared to a conventional HARQ/ARQ scheme. For example, with a sufficient number of parallel independent links, a very low FER (e.g., $10^{-8}$) can be achieved with one round of HARQ, as compared to eight HARQ/ARQ rounds that may be employed in a conventional scheme. Furthermore, a much lower rate can be obtained on the first transmission as compared to a conventional scheme (which may have a 10%-30% failure rate on the first transmission). In addition, the spectrum may be utilized more efficiently since the transmitter may adjust its coding more often (e.g., 10% of the time) as compared to a scenario where a link is configured for a lower failure rate (e.g., for a 1% failure rate, feedback is transmitted 1% of the time, on average).

Figure 7:
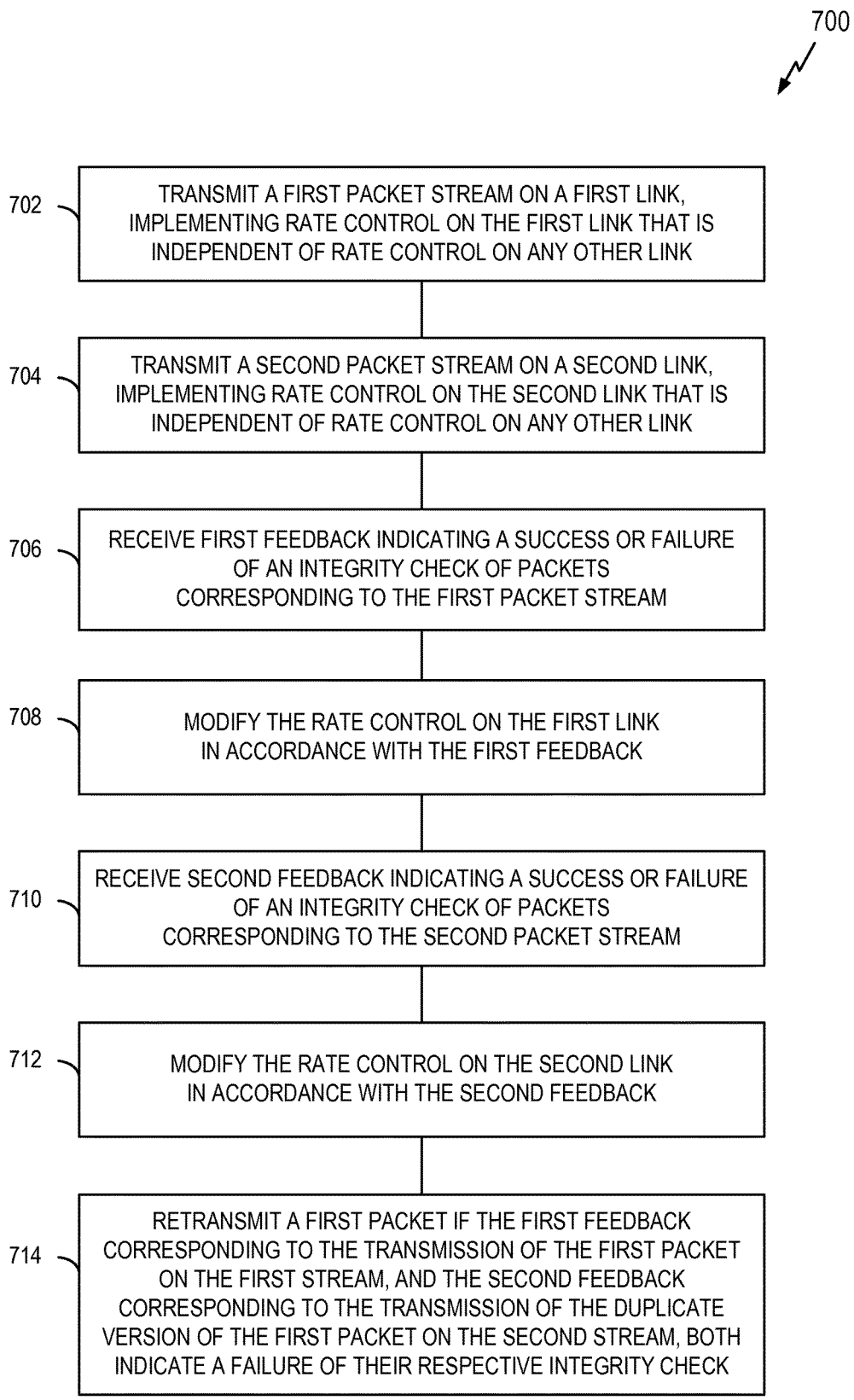
FIG. 7 is a flowchart illustrating an example of a process wherein feedback corresponding to an integrity check may be combined, such that failed packets are only retransmitted if the packet failed on each of a plurality of redundant links, in accordance with some aspects of the disclosure.

FIG. 7 is a flowchart illustrating a process 700 wherein feedback corresponding to an integrity check may be combined, such that failed packets are only retransmitted if the packet failed on each of a plurality of redundant links, in accordance with some aspects of the disclosure. In some aspects, the process 700 may be construed as being performed by a transmitting device (or transmitter).

The process 700 may take place within a processor/controller 240 or 290 (FIG. 2), which may be located at an AP, a UE, or some other suitable apparatus. In another aspect, the process 700 may be implemented by any of the UEs 130-140 or any of the APs 142-146 illustrated in FIG. 1. Of course, in various aspects within the scope of the present disclosure, the process 700 may be implemented by any suitable apparatus capable of supporting independent rate control operations on multiple links.

Blocks 702 to 712 are substantially the same as blocks 502 to 512, described above. At block 714, the apparatus may retransmit a first packet if the first feedback corresponding to the transmission of the first packet on the first stream, and the second feedback corresponding to the transmission of a duplicate version of the first packet on the second stream, both indicate a failure of their respective integrity check.

Figure 8:
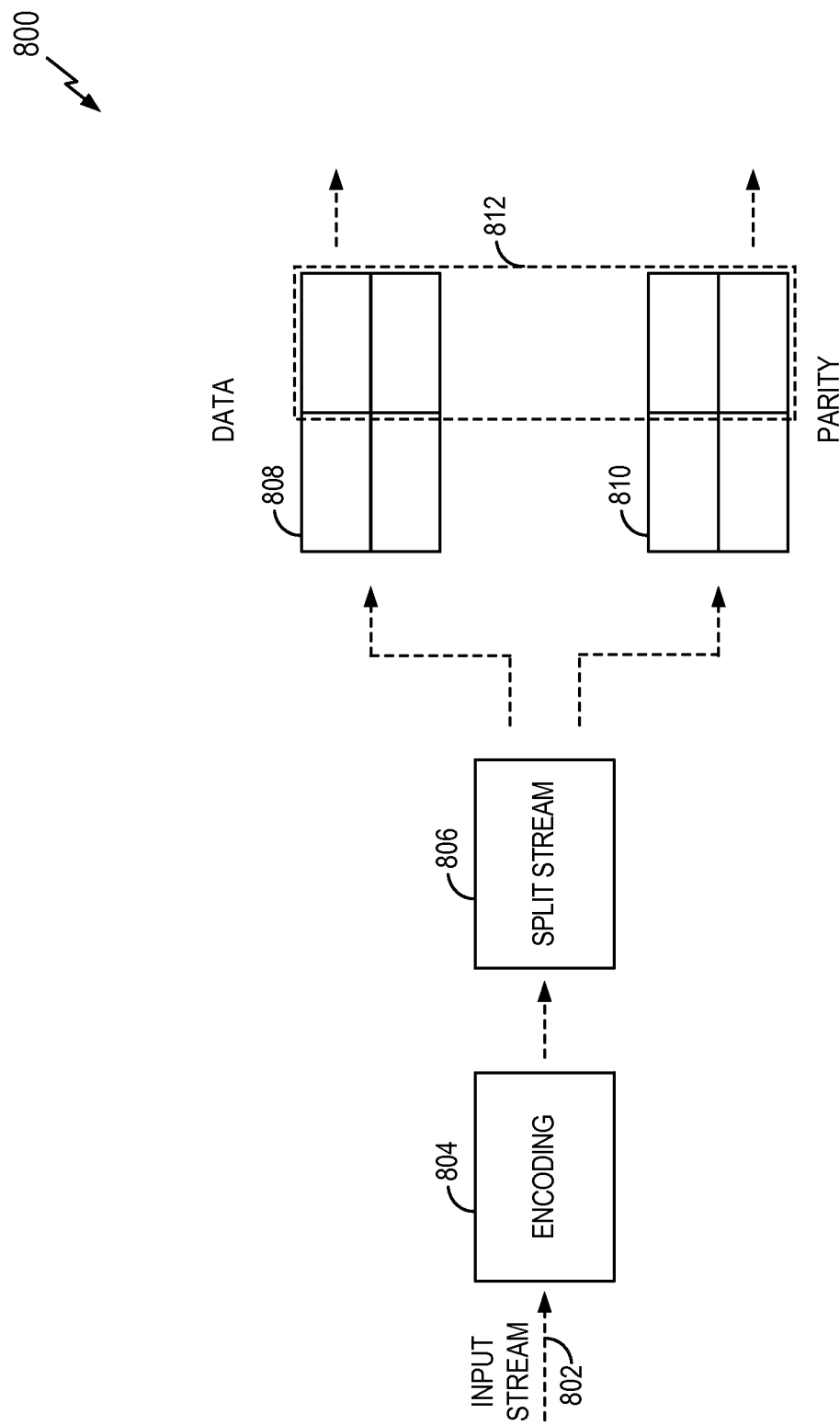
FIG. 8 is an illustration showing an example of a user data stream, and its parity or integrity check information, being encoded and divided among a plurality of links in accordance with some aspects of the disclosure.

In a still further aspect of the disclosure, the data on the multiple packet streams may be encoded together. For example, FIG. 8 is a schematic illustration 800 showing an input stream 802 (e.g., a user data stream), and its parity or integrity check information, being encoded and divided among a plurality of links in accordance with some aspects of the disclosure. Here, the input stream 802 (e.g., including one or more packet streams) is encoded at an encoding block 804 (e.g., employing Reed-Solomon or Hamming coding), and the resulting encoded data is divided by a stream splitting block 806 among a plurality of links, each link having an independent rate control loop as described above. In the example of FIG. 8, a first flow 808 including data for the input stream 802 is routed over a first link, while a second flow 810 including parity information for the input stream 802 is routed over a second link.

Thus, different portions of the encoded packet stream may be transmitted over each of the multiple links. In this example, as far as sources of error, the links are relatively independent, and furthermore, as described above, due to the utilization of independent rate control loops, separate power/MCS control loops are maintained for each link.

As represented by a dashed block 812, the encoding provides packet stream redundancy in this example. By virtue of the encoding of the packet stream, which may include conventional forward error correction (FEC) techniques and a selected level of redundancy in the information transmitted, recovery of most packet errors may be enabled even if one or more packets are lost on their respective link. Furthermore, relative to the schemes described above with redundant data packets being transmitted on each of the multiple links, this scheme may reduce the efficiency penalty, as the transmission of the same information on two or more links can be avoided in some examples.

Figure 9:
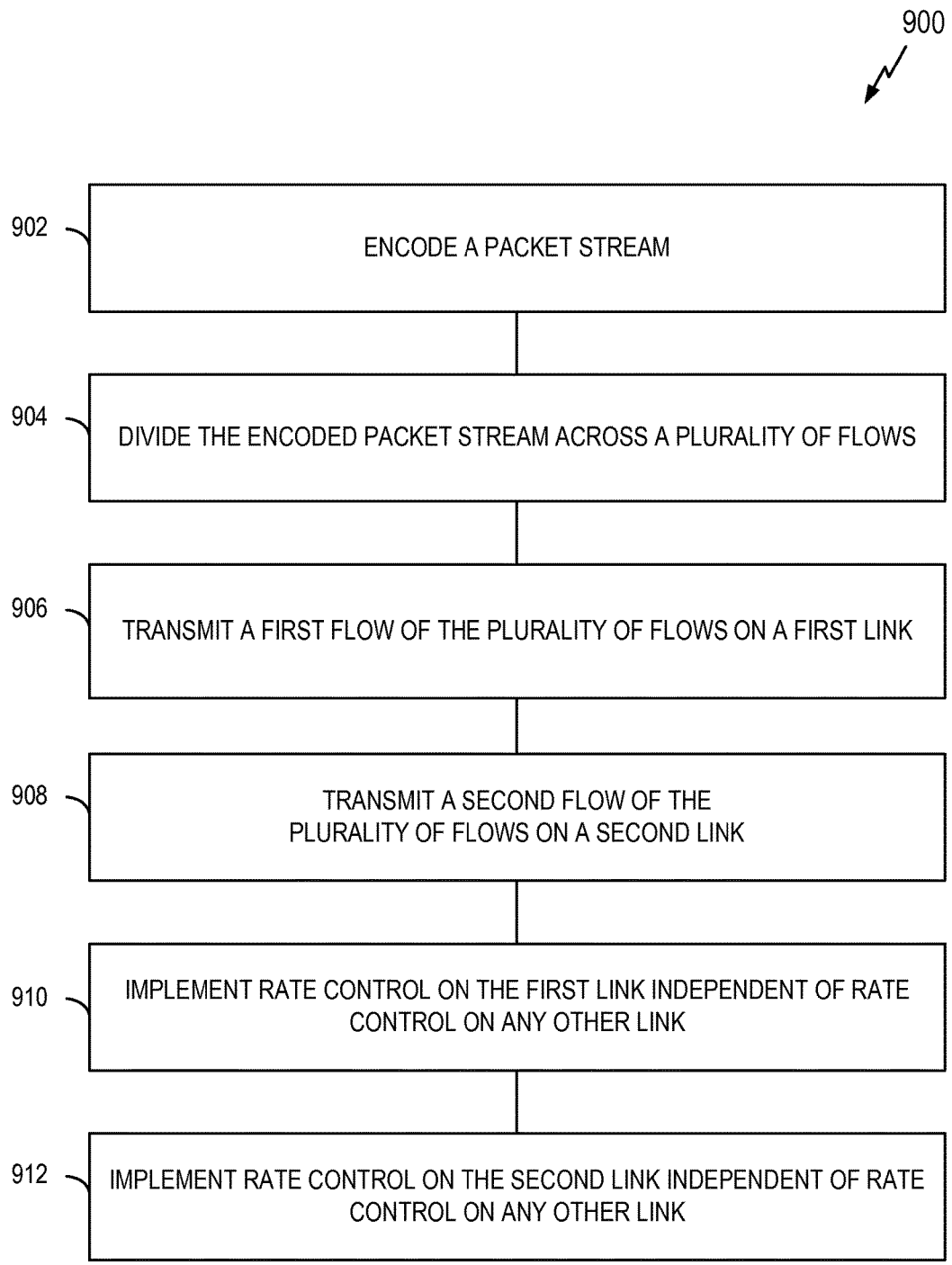
FIG. 9 is a flowchart illustrating an example of a process of dividing a packet stream across a plurality of flows on different links in accordance with some aspects of the disclosure.

FIG. 9 is a flowchart illustrating a process 900 of encoding data across a plurality of links with independent rate control loops in accordance with some aspects of the disclosure. In some aspects, the process 900 may be construed as being performed by a transmitting device (or transmitter).

The process 900 may take place within a processor/controller 240 or 290 (FIG. 2), which may be located at an AP, a UE, or some other suitable apparatus. In another aspect, the process 900 may be implemented by any of the UEs 130-140 or any of the APs 142-146 illustrated in FIG. 1. Of course, in various aspects within the scope of the present disclosure, the process 900 may be implemented by any suitable apparatus capable of supporting independent rate control operations on multiple links.

At block 902, an apparatus encodes a packet stream, and at block 904 the apparatus divides the encoded packet stream across a plurality of flows. At block 906, the apparatus transmits a first flow of the plurality of flows on a first link, and at block 908, the apparatus transmits a second flow of the plurality of flows on a second link. At block 910, the apparatus implements rate control on the first link, independent of rate control on the second link; and at block 912, the apparatus implements rate control on the second link, independent of rate control on the first link.

Figure 10:
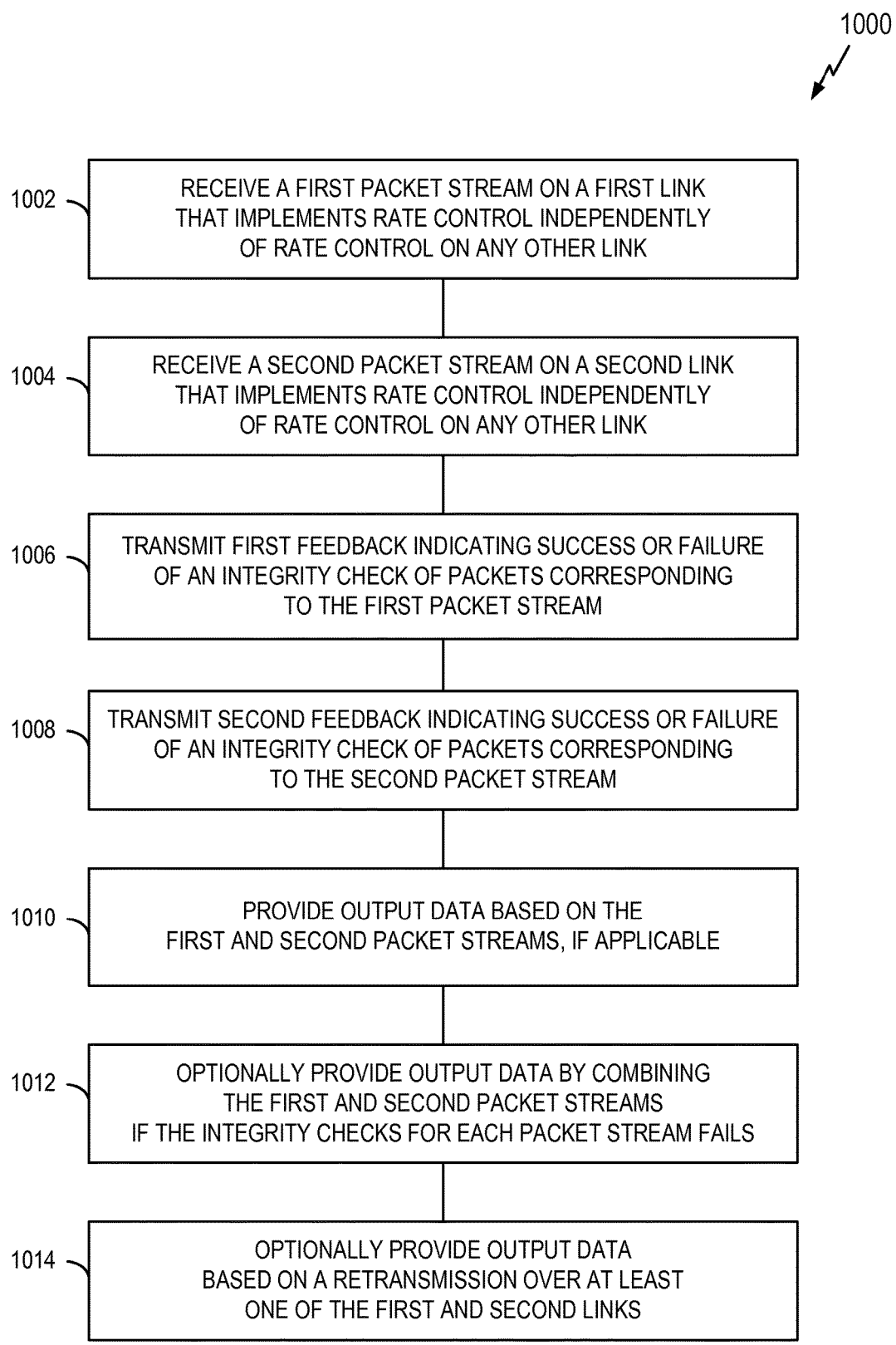
FIG. 10 is a flowchart illustrating an example of a process of generating feedback for received packet streams and providing output data in accordance with some aspects of the disclosure.

FIG. 10 is a flowchart illustrating a process 1000 of receiving packets over a plurality of links with independent rate control loops in accordance with some aspects of the disclosure. Thus, in some aspects, the process 1000 may be construed as being performed by a receiving device (or receiver). The terms receiving device or receiver indicate that a particular device is performing receive operations. It should be appreciated that such a device may also be capable of performing transmit operations.

The process 1000 may take place within a processor/controller 240 or 290 (FIG. 2), which may be located at an AP, a UE, or some other suitable apparatus. In another aspect, the process 1000 may be implemented by any of the UEs 130-140 or any of the APs 142-146 illustrated in FIG. 1. Of course, in various aspects within the scope of the present disclosure, the process 1000 may be implemented by any suitable apparatus capable of supporting independent rate control operations on multiple links.

At block 1002, an apparatus receives a first packet stream on a first link. Here, rate control is implemented on the first link, wherein the rate control on the first link is independent of the rate control on any other link.

At block 1004, the apparatus receives a second packet stream on a second link. The second packet stream includes duplicate packets to packets transmitted on the first packet stream. Rate control is implemented on the second link, wherein the rate control on the second link is independent of the rate control on the first link.

At block 1006, the apparatus transmits first feedback indicating a success or failure of an integrity check of packets corresponding to the first packet stream.

Similarly, at block 1008, the apparatus transmits second feedback indicating a success or failure of an integrity check of packets corresponding to the second packet stream.

At block 1010, the apparatus provides output data based on the first and second streams (e.g., if at least one of the streams passed its integrity check). At optional block 1012, if the integrity check for each packet fails, the apparatus may combine symbols from the received streams in an attempt to generate output data that passes an integrity check. At optional block 1014, in the event an HARQ retransmission or some other type of retransmission occurs over at least one of the links, the apparatus may generate output data based on the retransmission(s).

Rate Control with an Artificially Degraded Channel

In another aspect of the disclosure, rate control for a data stream can enable fast convergence even with very low packet error rates, without using multiple links with independent rate control loops. That is, in some aspects of the present disclosure, a transmitting device may configure the power and/or MCS for a single link for a very low CRC failure rate, e.g., ≤0.5%. To address the issue of slow convergence (e.g., resulting from the low failure rate and corresponding low amount of feedback) for link adaptation, the stream may be artificially degraded at the receiving device before generating the ACK/NACK feedback to transmit to the transmitting device.

Figure 11:
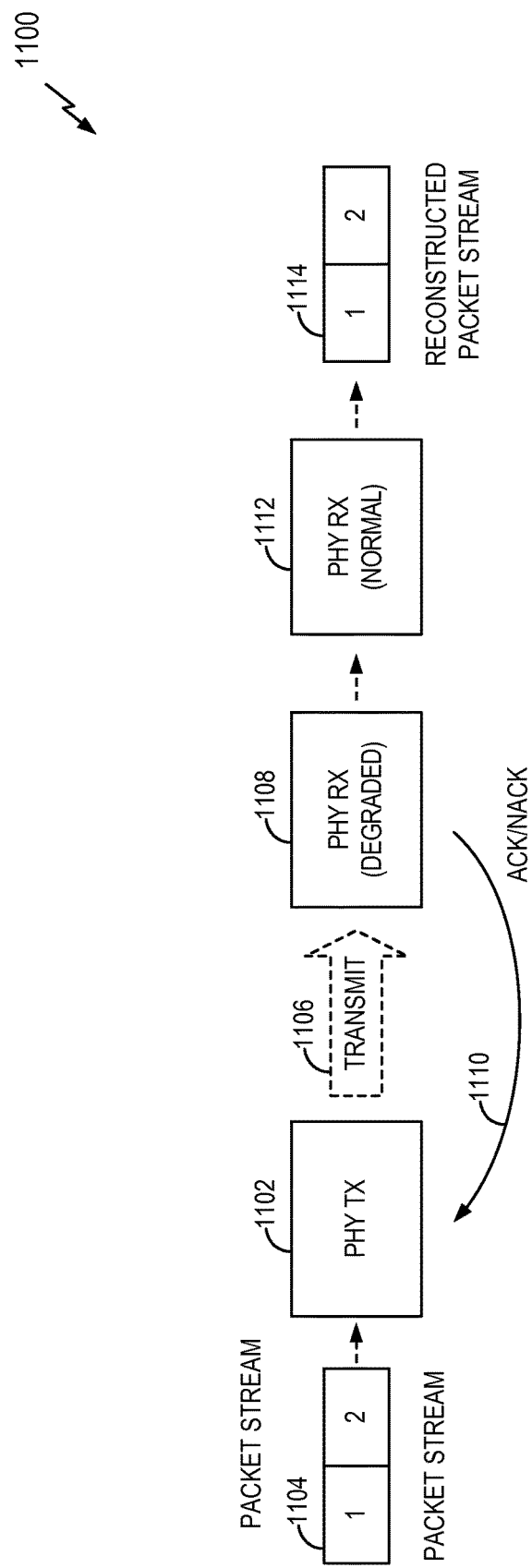
FIG. 11 is a diagram of an example of a data stream with a rate control loop that includes artificial degradation in accordance with some aspects of the disclosure.

FIG. 11 is a schematic diagram 1100 of one example of a data stream with a rate control loop that includes artificial degradation in accordance with an aspect of the disclosure. Here, a PHY transmitter 1102 of a transmitting device (not shown) selects one or more transmission characteristics, such as the power and/or MCS, and transmits a packet stream 1104 over a wireless link, as represented by a transmit symbol 1106. A PHY receiver 1108 at a receiving device (not shown) receives the transmitted packet stream, and based at least in part on the characteristics of the wireless channel, one or more of the packets may have degraded by some amount. In an aspect of the disclosure, the PHY receiver 1108 may apply an artificial degradation to the received stream. In some implementations, the degradation may correspond to the insertion of a controlled amount of noise (e.g., 6 dB) into the received stream. Here, the noise may take any suitable form, such as but not necessarily limited to white noise. Within the scope of the present disclosure, the degradation may take other forms, not being limited to the insertion or application of noise, including but not limited to puncturing the data, deletion of selected or random samples, or the application of limiting decoding (e.g., by running fewer iterations of a decoder than normal).

By applying the degradation to the received packet stream, the receiving device may increase the CRC (or other suitable integrity check) failure rate of the degraded stream. Accordingly, the receiving device may transmit feedback information 1110 to the transmitting device in accordance with the degraded stream, the feedback information including responses relating to the integrity check (e.g., HARQ ACK/NACK responses). That is, even though a particular packet may have been received at sufficiently high quality that it could be properly decoded and could pass an integrity check, after application of the artificial degradation, this packet may fail its integrity check, and the receiving device may accordingly transmit a NACK. Accordingly, the transmitting device may reconfigure its transmission characteristics, such as the transmit power and/or MCS, in accordance with its detected packet error rate (which corresponds to the artificially degraded stream). That is, in an aspect of the disclosure, the transmitting device may configure its transmission to target a particular error rate at the receiver, where the error rate corresponds to an increased error rate brought about by an artificial degradation of the data stream.

Referring still to FIG. 11, in parallel to or independent of the artificial degradation, a PHY receiver 1112 of the receiving device may decode the received data stream (i.e., the stream without the artificial degradation). The resulting decoded data stream 1114 may accordingly represent the best reconstruction of the transmitted packet stream as the receiving device can achieve. For purposes of illustration, FIG. 11 depicts two separate PHY receivers 1108 and 1112. In some implementations, however, all decoding operations (degraded and normal) may be performed by a single entity.

In a further aspect of the disclosure, the receiving device may control the degree to which the artificial degradation actually degrades the received data stream. In this way, by knowing the amount of degradation applied, a suitable power/MCS can be targeted at the transmitting device that in reality can achieve a very low overall failure rate, even though the transmitting device may be receiving ACK/NACK feedback indicating a relatively high failure rate. As one nonlimiting example, a suitable level of degradation may be applied to result in ACK/NACK feedback indicating a failure rate of 10%, when in fact the non-degraded failure rate may be 1% or lower.

Although not pictured, a second feedback ACK/NACK message requesting retransmission after the second non-degraded decoder (e.g., in the PHY receiver 1112) may be added. In FIG. 11, it is assumed that the error rate after this second decoder is small enough to skip this message.

Figure 12:
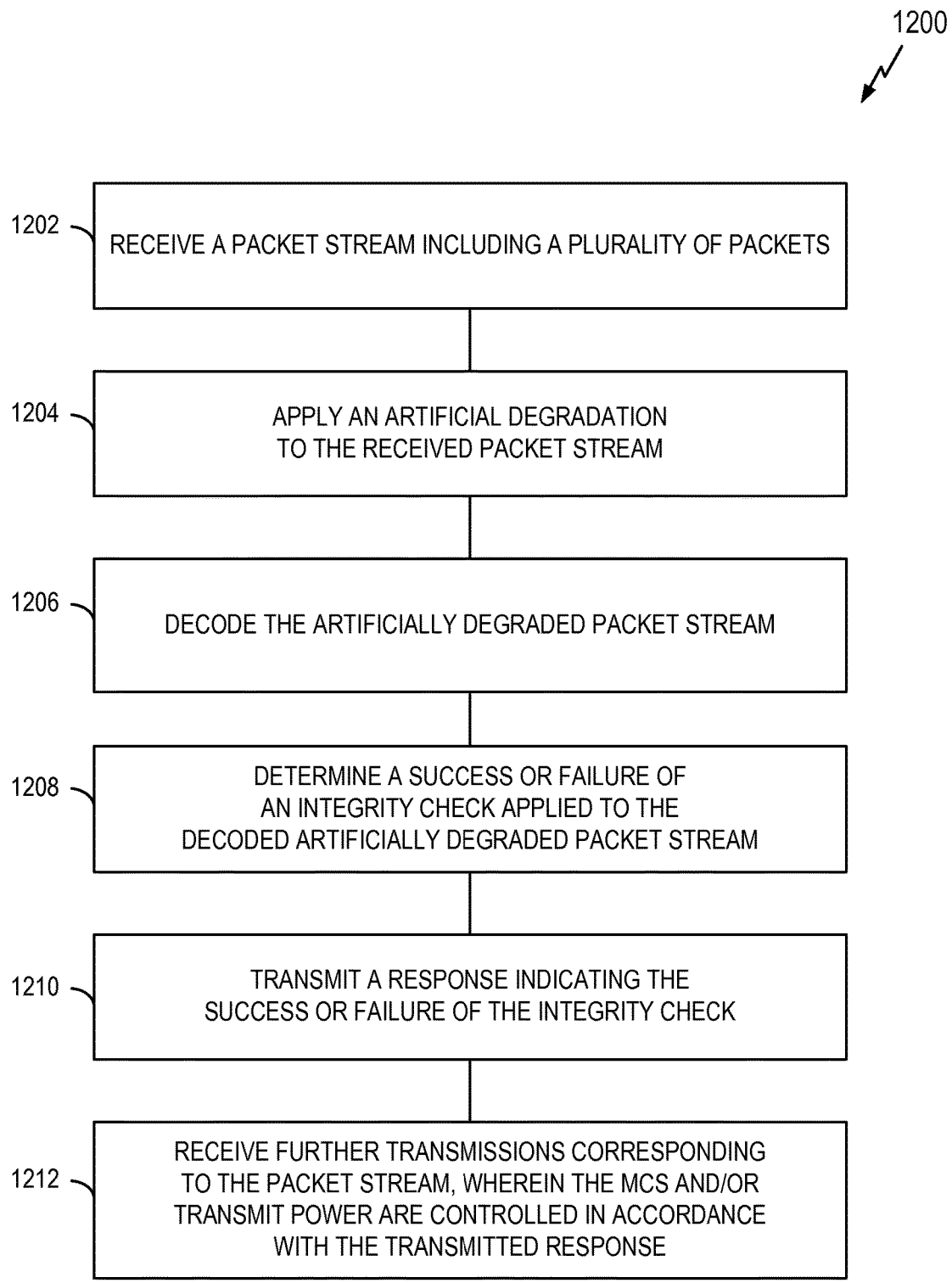
FIG. 12 is a flowchart illustrating an example of a process of implementing artificial degradation of a data stream to enable tight control of a low cyclic redundancy check (CRC) failure rate in accordance with some aspects of the disclosure.

FIG. 12 is a flowchart illustrating a process 1200 of implementing artificial degradation of a data stream to enable tight control of a low CRC failure rate in accordance with some aspects of the disclosure. In some aspects, the process 1200 may be construed as being performed by a receiving device (or receiver).

The process 1200 may take place within a processor/controller 240 or 290 (FIG. 2), which may be located at an AP, a UE, or some other suitable apparatus. In another aspect, the process 1200 may be implemented by any of the UEs 130-140 or any of the APs 142-146 illustrated in FIG. 1. Of course, in various aspects within the scope of the present disclosure, the process 1200 may be implemented by any suitable apparatus capable of supporting artificial degradation of packets.

At block 1202, an apparatus receives a packet stream including a plurality of packets.

At block 1204, the apparatus applies an artificial degradation to the received packet stream. For example, the apparatus may inject noise into the received stream, puncture symbols of the received stream, remove packets of the received stream, or perform limited decoding of the received stream.

At block 1206, the apparatus decodes the artificially degraded packet stream. At block 1208, the apparatus determines a success or failure of an integrity check (e.g., CRC) applied to the decoded artificially degraded packet stream. At block 1210, the apparatus transmits a response, indicating the success or failure of the integrity check.

Finally, at block 1212 the apparatus may receive further transmissions corresponding to the packet stream, wherein an MCS or transmit power may be controlled in accordance with the transmitted response. For example, if the apparatus transmitted a NACK at block 1210, subsequent transmission may have a better coding rate or higher transmission power.

Figure 13:
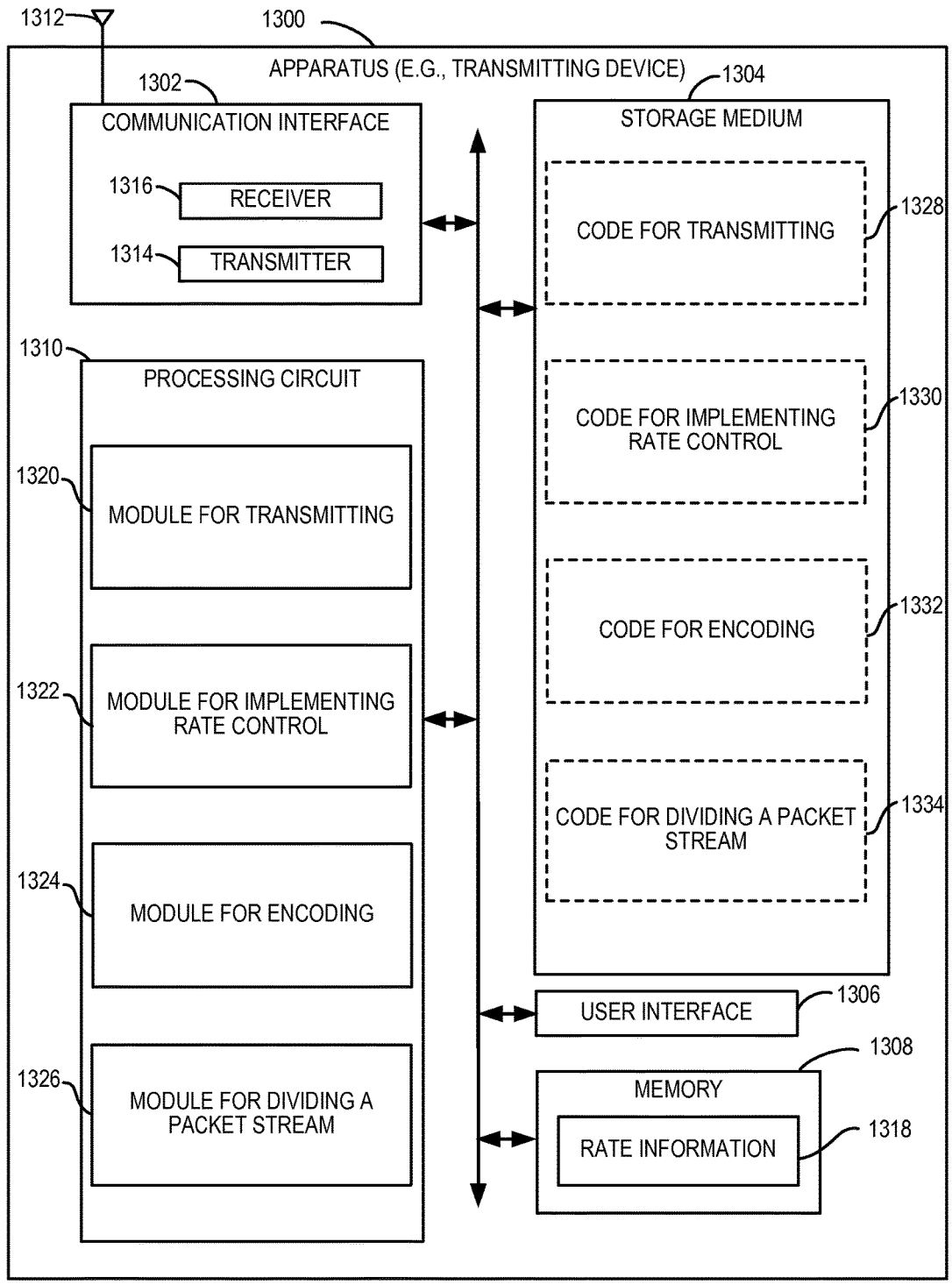
FIG. 13 is a block diagram illustrating select components of an apparatus configured to implement independent rate control loops in accordance with some aspects of the disclosure.

FIG. 13 is an illustration of an apparatus 1300 (e.g., including transmitting device functionality) configured according to one or more aspects of the disclosure. The apparatus 1300 includes a communication interface (e.g., at least one transceiver) 1302, a storage medium 1304, a user interface 1306, a memory 1308, and a processing circuit 1310.

These components can be coupled to and/or placed in electrical communication with one another via a signaling bus or other suitable component, represented generally by the connection lines in FIG. 13. The signaling bus may include any number of interconnecting buses and bridges depending on the specific application of the processing circuit 1310 and the overall design constraints. The signaling bus links together various circuits such that each of the communication interface 1302, the storage medium 1304, the user interface 1306, and the memory 1308 are coupled to and/or in electrical communication with the processing circuit 1310. The signaling bus may also link various other circuits (not shown) such as timing sources, peripherals, voltage regulators, and power management circuits, which are well known in the art, and therefore, will not be described any further.

The communication interface 1302 may be adapted to facilitate wireless communication of the apparatus 1300. For example, the communication interface 1302 may include circuitry and/or programming adapted to facilitate the communication of information bi-directionally with respect to one or more communication devices in a network. The communication interface 1302 may be coupled to one or more antennas 1312 for wireless communication within a wireless communication system. The communication interface 1302 can be configured with one or more standalone receivers and/or transmitters, as well as one or more transceivers. In the illustrated example, the communication interface 1302 includes a transmitter 1314 and a receiver 1316.

The memory 1308 may represent one or more memory devices. As indicated, the memory 1308 may maintain rate information 1318 along with other information used by the apparatus 1300. In some implementations, the memory 1308 and the storage medium 1304 are implemented as a common memory component. The memory 1308 may also be used for storing data that is manipulated by the processing circuit 1310 or some other component of the apparatus 1300.

The storage medium 1304 may represent one or more computer-readable, machine-readable, and/or processor-readable devices for storing programming, such as processor executable code or instructions (e.g., software, firmware), electronic data, databases, or other digital information. The storage medium 1304 may also be used for storing data that is manipulated by the processing circuit 1310 when executing programming. The storage medium 1304 may be any available media that can be accessed by a general purpose or special purpose processor, including portable or fixed storage devices, optical storage devices, and various other mediums capable of storing, containing or carrying programming.

By way of example and not limitation, the storage medium 1304 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1304 may be embodied in an article of manufacture (e.g., a computer program product). By way of example, a computer program product may include a computer-readable medium in packaging materials. In view of the above, in some implementations, the storage medium 1304 may be a non-transitory (e.g., tangible) storage medium.

The storage medium 1304 may be coupled to the processing circuit 1310 such that the processing circuit 1310 can read information from, and write information to, the storage medium 1304. That is, the storage medium 1304 can be coupled to the processing circuit 1310 so that the storage medium 1304 is at least accessible by the processing circuit 1310, including examples where at least one storage medium is integral to the processing circuit 1310 and/or examples where at least one storage medium is separate from the processing circuit 1310 (e.g., resident in the apparatus 1300, external to the apparatus 1300, distributed across multiple entities, etc.).

Programming stored by the storage medium 1304, when executed by the processing circuit 1310, causes the processing circuit 1310 to perform one or more of the various functions and/or process operations described herein. For example, the storage medium 1304 may include operations configured for regulating operations at one or more hardware blocks of the processing circuit 1310, as well as to utilize the communication interface 1302 for wireless communication utilizing their respective communication protocols.

The processing circuit 1310 is generally adapted for processing, including the execution of such programming stored on the storage medium 1304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1310 is arranged to obtain, process and/or send data, control data access and storage, issue commands, and control other desired operations. The processing circuit 1310 may include circuitry configured to implement desired programming provided by appropriate media in at least one example. For example, the processing circuit 1310 may be implemented as one or more processors, one or more controllers, and/or other structure configured to execute executable programming Examples of the processing circuit 1310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1310 are for illustration and other suitable configurations within the scope of the disclosure are also contemplated.

According to one or more aspects of the disclosure, the processing circuit 1310 may be adapted to perform any or all of the features, processes, functions, operations and/or routines for any or all of the apparatuses described herein. As used herein, the term "adapted" in relation to the processing circuit 1310 may refer to the processing circuit 1310 being one or more of configured, employed, implemented, and/or programmed to perform a particular process, function, operation and/or routine according to various features described herein.

According to at least one example of the apparatus 1300, the processing circuit 1310 may include one or more of a module for transmitting 1320, a module for implementing rate control 1322, a module for encoding 1324, and a module for dividing a packet stream 1326.

The module for transmitting 1320 may include circuitry and/or programming (e.g., code for transmitting 1328 stored on the storage medium 1304) adapted to perform several functions relating to, for example, transmitting and/or retransmitting different packet streams on different links. Initially, the module for transmitting 1320 obtains data to be transmitted. For example, the module for transmitting 1320 may obtain this data directly from a component of the apparatus (e.g., the memory 1308 or some other component). In some implementations, the module for transmitting 1320 processes (e.g., encodes) the data to be transmitted. The module for transmitting 1320 then causes the data to be transmitted. For example, the module for transmitting 1320 can pass the data to the transmitter 1314.

The module for implementing rate control 1322 may include circuitry and/or programming (e.g., code for implementing rate control 1330 stored on the storage medium 1304) adapted to perform several functions relating to, for example, independently adapting rate control on different links. In some implementations, the module for implementing rate control 1322 receives feedback for a link, determines whether and/or how to adapt a coding rate for the link based on the feedback, and reconfigures a transmitter to use the adapted coding rate.

The module for encoding 1324 may include circuitry and/or programming (e.g., code for encoding 1332 stored on the storage medium 1304) adapted to perform several functions relating to, for example, encoding a packet stream. In some implementations, the module for encoding 1324 obtains information to be encoded, encodes the information according to a designated encoding algorithm, and outputs encoded information.

The module for dividing a packet stream 1326 may include circuitry and/or programming (e.g., code for dividing a packet stream 1326 stored on the storage medium 1304) adapted to perform several functions relating to, for example, dividing an initial packet stream into two or more packet streams. In some implementations, the module for dividing a packet stream 1326 obtains a packet stream, splits the packet stream into a plurality of flows, and routes the flows for transmission via different links.

As mentioned above, programming stored by the storage medium 1304, when executed by the processing circuit 1310, causes the processing circuit 1310 to perform one or more of the various functions and/or process operations described herein. For example, the storage medium 1304 may include one or more of the code for transmitting 1328, the code for implementing rate control 1330, the code for encoding 1332, or the code for dividing a packet stream 1334.

Figure 14:
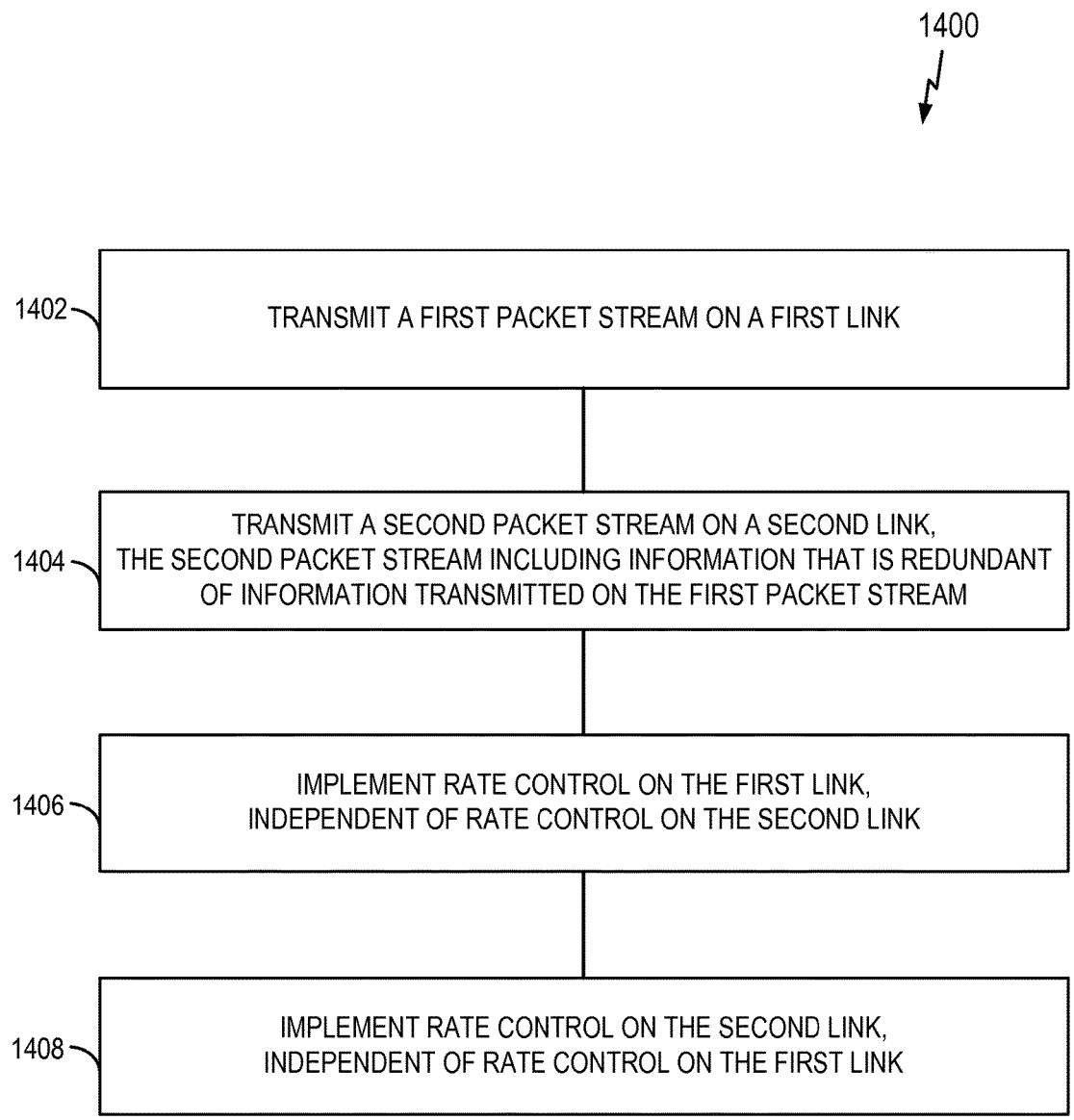
FIG. 14 is a flowchart illustrating an example of a process of transmitting a plurality of links with independent rate control loops in accordance with some aspects of the disclosure.

FIG. 14 illustrates a process 1400 for providing independent rate control on multiple links in accordance with some aspects of the disclosure. The process 1400 may take place within the processing circuit 1310 (FIG. 13), which may be located at an AP, a UE, or some other suitable apparatus. In another aspect, the process 1400 may be implemented by any of the UEs 130-140 or any of the APs 142-146 illustrated in FIG. 1. Of course, in various aspects within the scope of the present disclosure, the process 1400 may be implemented by any suitable apparatus capable of supporting independent rate control operations on multiple links.

At block 1402, an apparatus transmits a first packet stream on a first link.

At block 1404, the apparatus transmits a second packet stream on a second link. The second packet stream includes information that is redundant of information transmitted on the first packet stream. In some aspects, the information that is redundant of information transmitted on the first packet stream comprises duplicate packets to packets transmitted on the first packet stream. In some aspects, the information that is redundant of information transmitted on the first packet stream comprises parity information for the information transmitted on the first packet stream.

In some aspects, the first link is transmitted over a first carrier frequency, and the second link is transmitted over a second carrier frequency different from the first carrier frequency. In some aspects, the first link is transmitted utilizing a first antenna, and the second link is transmitted utilizing a second antenna different from the first antenna.

At block 1406, the apparatus implements rate control on the first link, wherein the rate control on the first link is independent of the rate control on the second link. In some aspects, the rate control on the first link includes setting at least one rate control parameter of the first link in accordance with feedback indicating success or failure of an integrity check of packets corresponding to the first packet stream. In some aspects, the at least one rate control parameter of the first link comprises at least one of a modulation scheme of the first link, a coding scheme of the first link, or a transmission power of the first link.

At block 1408 the apparatus implements rate control on the second link, wherein the rate control on the second link is independent of the rate control on the first link. In some aspects, the rate control on the second link includes setting at least one rate control parameter of the second link in accordance with feedback indicating success or failure of an integrity check of packets corresponding to the second packet stream. In some aspects, the at least one rate control parameter of the second link comprises at least one of a modulation scheme of the second link, a coding scheme of the second link, or a transmission power of the second link.

Figure 15:
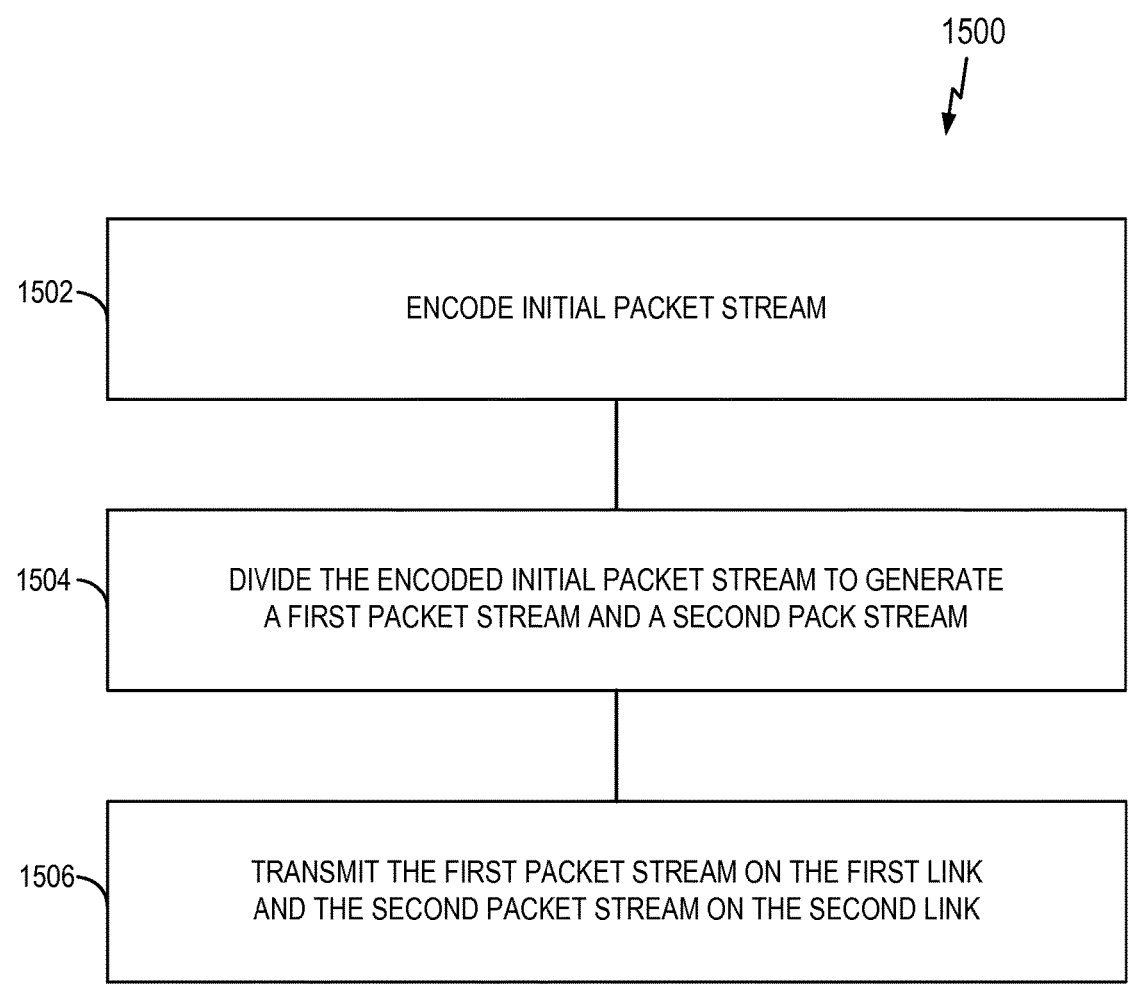
FIG. 15 is a flowchart illustrating additional aspects of a process of transmitting a plurality of links with independent rate control loops in accordance with some aspects of the disclosure.

FIG. 15 illustrates a process 1500 including additional aspects for providing independent rate control on multiple links in accordance with some aspects of the disclosure. The process 1500 may take place within the processing circuit 1310 (FIG. 13), which may be located at an AP, a UE, or some other suitable apparatus. In another aspect, the process 1500 may be implemented by any of the UEs 130-140 or any of the APs 142-146 illustrated in FIG. 1. Of course, in various aspects within the scope of the present disclosure, the process 1500 may be implemented by any suitable apparatus capable of supporting independent rate control operations on multiple links.

At block 1502, an apparatus encodes an initial packet stream. For example, encoding may be applied to generate parity information for the packet stream.

At block 1504, the apparatus divides the encoded initial packet stream to generate a first packet stream and a second packet stream. For example, the first packet stream may include data for the initial packet stream, and the second packet stream may include parity information for the initial packet stream.

At block 1506, the apparatus transmits the first packet stream on a first link, and transmits the second packet stream on a second link. Thus, redundant information may be transmitted over independent links as discussed herein.

Figure 16:
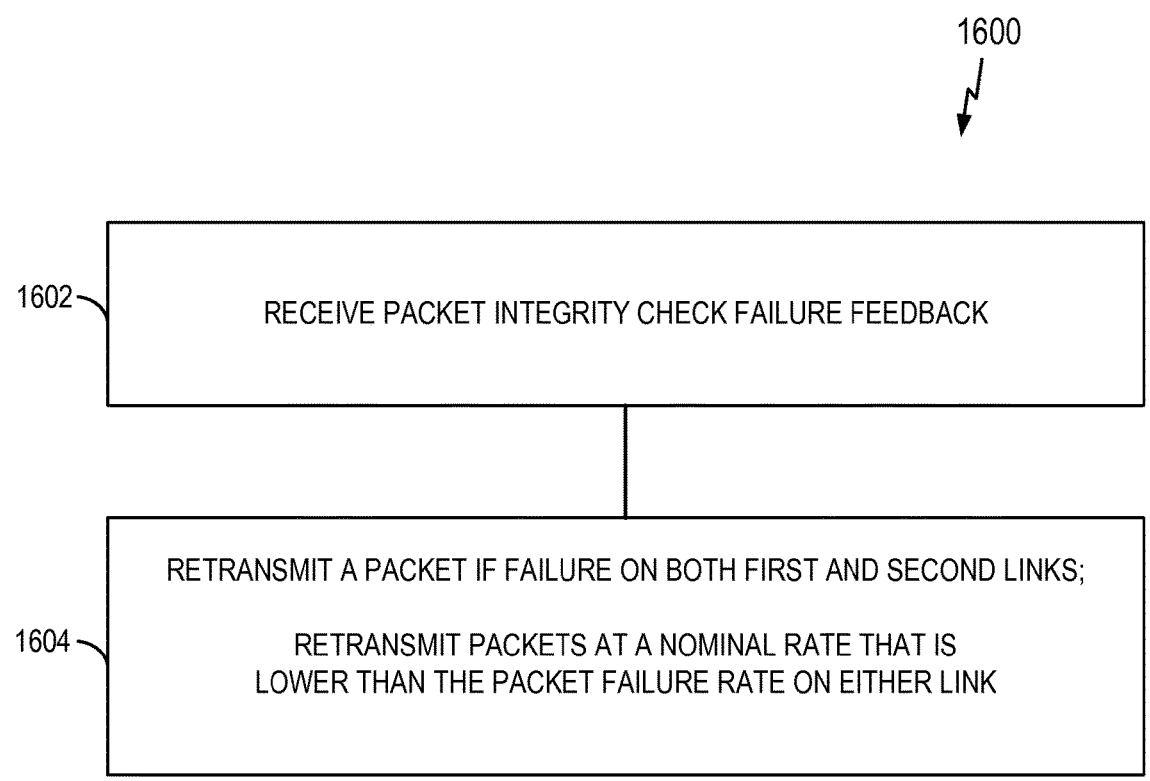
FIG. 16 is a flowchart illustrating additional aspects of a process of transmitting a plurality of links with independent rate control loops in accordance with some aspects of the disclosure.

FIG. 16 illustrates a process 1600 including additional aspects for providing independent rate control on multiple links in accordance with some aspects of the disclosure. The process 1600 may take place within the processing circuit 1310 (FIG. 13), which may be located at an AP, a UE, or some other suitable apparatus. In another aspect, the process 1600 may be implemented by any of the UEs 130-140 or any of the APs 142-146 illustrated in FIG. 1. Of course, in various aspects within the scope of the present disclosure, the process 1600 may be implemented by any suitable apparatus capable of supporting independent rate control operations on multiple links.

At block 1602, an apparatus receives integrity check failure feedback. For example, the apparatus may receive ACK/NACK information on independent links.

At block 1604, the apparatus retransmits a packet if feedback corresponding to transmission of the packet on the first stream, and feedback corresponding to transmission of a duplicate version of the packet on the second stream, both indicate a failure of a respective integrity check. In some aspects, the apparatus may retransmit packets for the first and second links at a first nominal (e.g., average or approximate) rate, wherein the first nominal rate is lower than a nominal packet failure rate on the first link and the first nominal rate is lower than a nominal packet failure rate on the second link.

Figure 17:
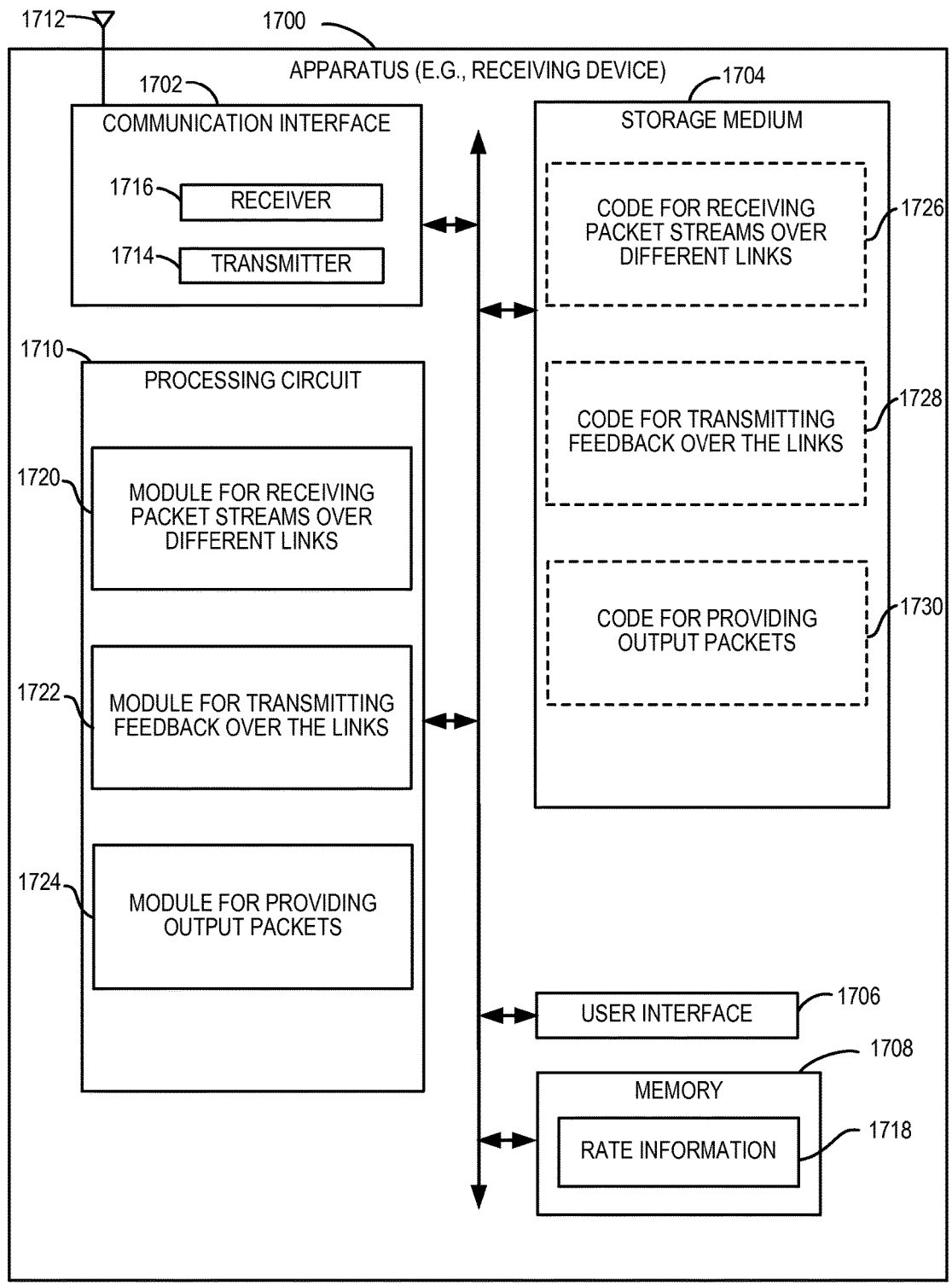
FIG. 17 is a block diagram illustrating select components of an apparatus configured to provide feedback over a plurality of links with independent rate control loops in accordance with some aspects of the disclosure.

FIG. 17 is an illustration of an apparatus 1700 (e.g., including receiver device functionality) configured according to one or more aspects of the disclosure. The apparatus 1700 includes a communication interface (e.g., at least one transceiver) 1702, a storage medium 1704, a user interface 1706, a memory 1708, and a processing circuit 1710. The communication interface 1702 includes a transmitter 1714 and a receiver 1716. The memory 1708 may represent one or more memory devices. As indicated, the memory 1708 may maintain rate information 1718 along with other information used by the apparatus 1700. In some implementations, the memory 1708 and the storage medium 1704 are implemented as a common memory component. The memory 1708 may also be used for storing data that is manipulated by the processing circuit 1710 or some other component of the apparatus 1700. The general functionality of these components is similar to the functionality of the corresponding components described above in conjunction with FIG. 13.

According to at least one example of the apparatus 1700, the processing circuit 1710 may include one or more of a module for receiving packet streams over different links 1720, a module for transmitting feedback over the links 1722, and a module for providing output packets 1724.

The module for receiving packet streams over different links 1720 may include circuitry and/or programming (e.g., code for receiving packet streams over different links 1726 stored on the storage medium 1704) adapted to perform several functions relating to, for example, receiving different packet streams on different independent links. Initially, the module for receiving packet streams over different links 1720 obtains received data. For example, the module for receiving packet streams over different links 1720 may obtain this data directly from a component of the apparatus (e.g., the receiver 1716 or some other component). In some implementations, the module for receiving packet streams over different links 1720 processes (e.g., decodes) the received data. The module for receiving 1720 then outputs the received data (e.g., stores the data in the memory 1708 or sends the data to another component of the apparatus 1702).

The module for transmitting feedback over the links 1722 may include circuitry and/or programming (e.g., code for transmitting feedback over the links 1728 stored on the storage medium 1704) adapted to perform several functions relating to, for example, transmitting ACK/NACK feedback on independent links. Initially, the module for transmitting feedback over the links 1722 obtains feedback data to be transmitted. For example, the module for transmitting feedback over the links 1722 may obtain this data directly from a component of the apparatus (e.g., the memory 1708 or some other component). In some implementations, the module for transmitting feedback over the links 1722 processes (e.g., encodes) the data to be transmitted. The module for transmitting feedback over the links 1722 then causes the feedback data to be transmitted. For example, the module for transmitting feedback over the links 1722 can pass the feedback data to the transmitter 1714.

The module for providing output packets 1724 may include circuitry and/or programming (e.g., code for providing output packets 1730 stored on the storage medium 1704) adapted to perform several functions relating to, for example, outputting data that passed an integrity check. In some implementations, the module for providing output packets 1724 obtains a recovered packet stream, and routes the stream to another component of the apparatus 1702.

As mentioned above, programming stored by the storage medium 1704, when executed by the processing circuit 1710, causes the processing circuit 1710 to perform one or more of the various functions and/or process operations described herein. For example, the storage medium 1704 may include one or more of the code for receiving packet streams over different links 1726, the code for transmitting feedback over the links 1728, or the code for providing output packets 1730.

Figure 18:
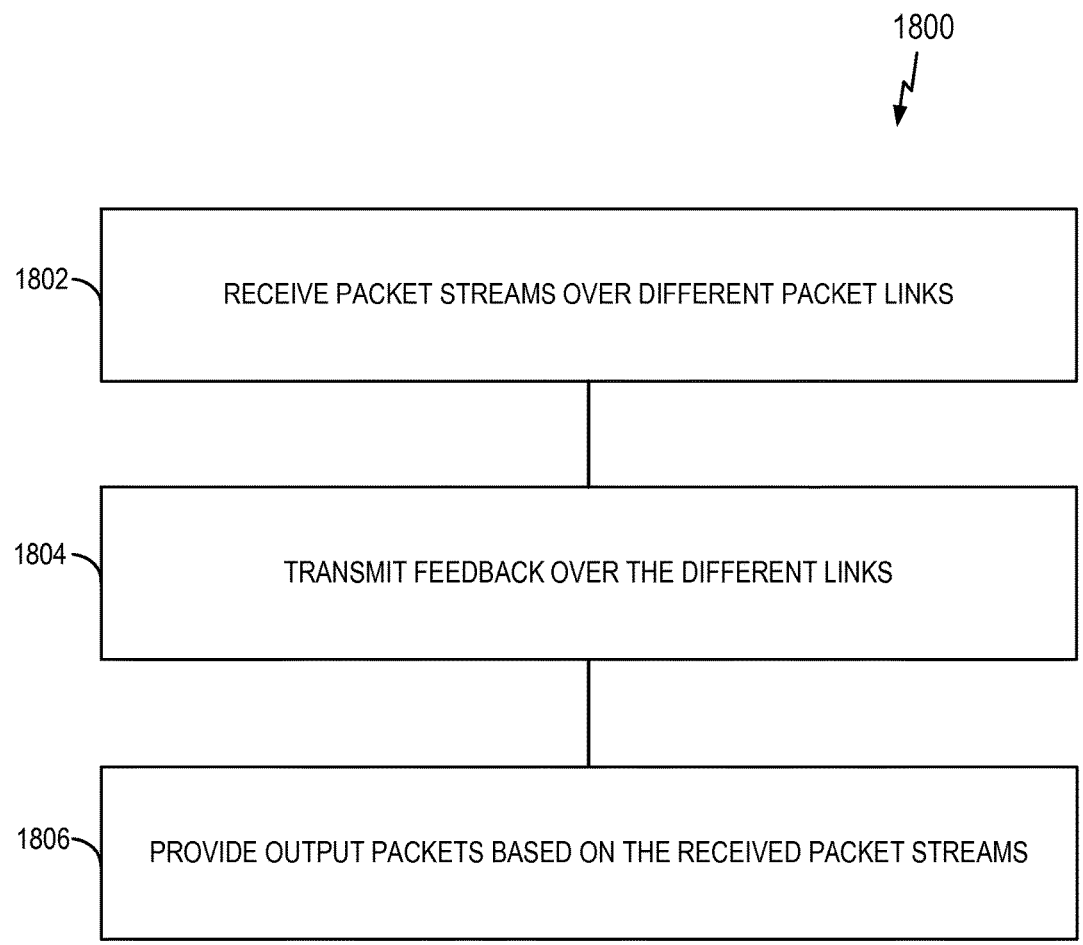
FIG. 18 is a flowchart illustrating an example of a process of providing feedback over a plurality of links with independent rate control loops in accordance with some aspects of the disclosure.

FIG. 18 illustrates a process 1800 for providing independent rate control on multiple links in accordance with some aspects of the disclosure. The process 1800 may take place within the processing circuit 1710 (FIG. 17), which may be located at an AP, a UE, or some other suitable apparatus. In another aspect, the process 1800 may be implemented by any of the UEs 130-140 or any of the APs 142-146 illustrated in FIG. 1. Of course, in various aspects within the scope of the present disclosure, the process 1800 may be implemented by any suitable apparatus capable of supporting independent rate control operations on multiple links.

At block 1802, an apparatus receives packet streams over different packet links. For example, the apparatus may receive a first packet stream on a first link and receive a second packet stream on a second link.

At block 1804, the apparatus transmits feedback over the different links. For example, the apparatus may transmit first feedback indicating a success or failure of an integrity check of packets corresponding to the first packet stream over the first link, and transmit second feedback indicating a success or failure of an integrity check of packets corresponding to the second packet stream over the second link.

At block 1806, the apparatus provides output data based on the received streams (e.g., if at least one of the streams passed its integrity check). If the integrity check for each packet fails, the apparatus may combine symbols from the received streams in an attempt to generate output data that passes an integrity check. In the event a retransmission occurs over at least one of the links, the apparatus may generate output data based on the retransmission.

Figure 19:
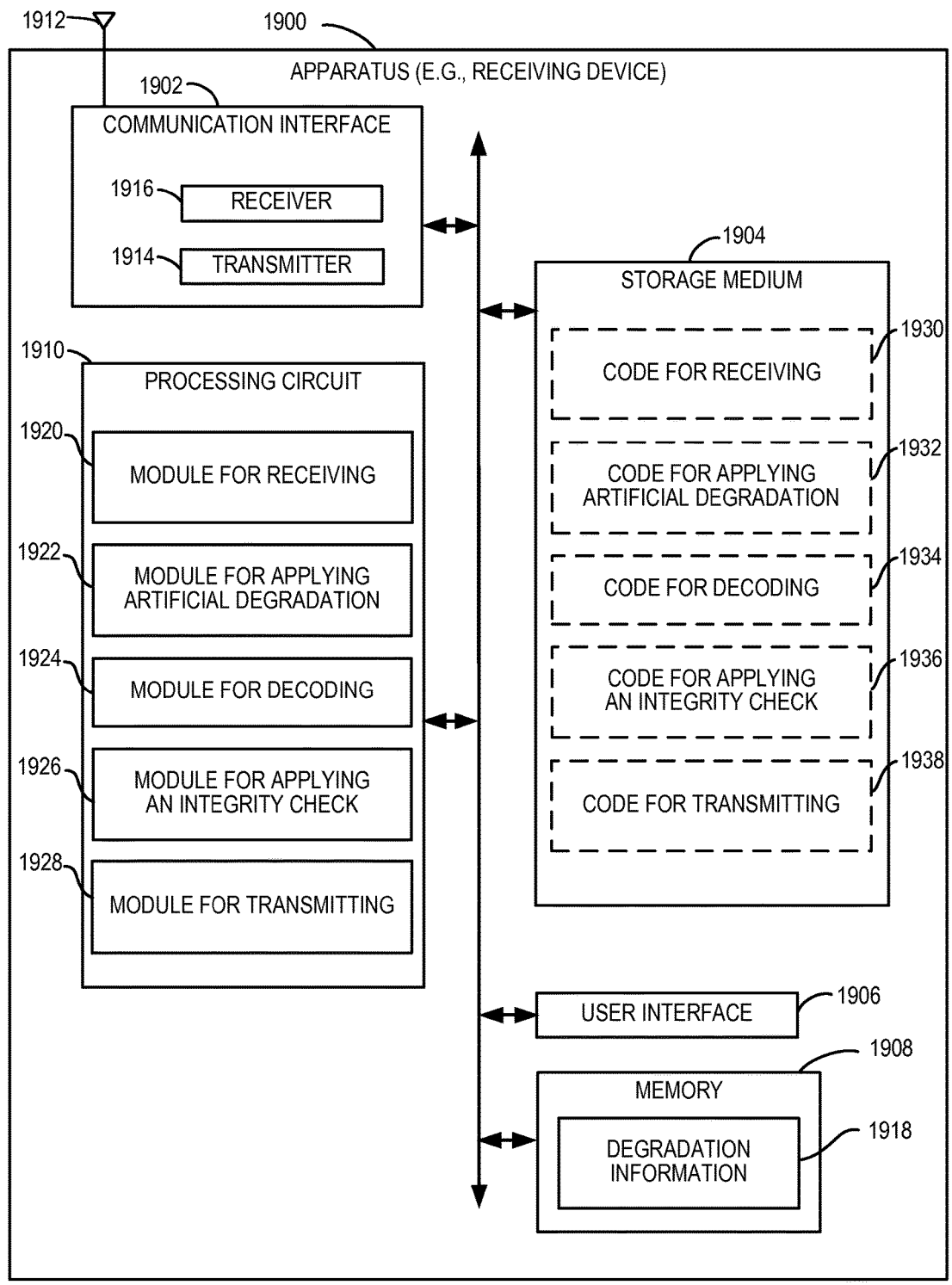
FIG. 19 is a block diagram illustrating select components of an apparatus configured to implement artificial degradation of a data stream in accordance with some aspects of the disclosure.

FIG. 19 is an illustration of an apparatus 1900 (e.g., including receiving device functionality) configured according to one or more aspects of the disclosure. The apparatus 1900 includes a communication interface (e.g., at least one transceiver) 1902, a storage medium 1904, a user interface 1906, a memory 1908, and a processing circuit 1910. The communication interface 1902 includes a transmitter 1914 and a receiver 1916. The memory 1908 may represent one or more memory devices. As indicated, the memory 1908 may maintain degradation information 1918 along with other information used by the apparatus 1900. In some implementations, the memory 1908 and the storage medium 1904 are implemented as a common memory component. The memory 1908 may also be used for storing data that is manipulated by the processing circuit 1910 or some other component of the apparatus 1900. The general functionality of these components is similar to the functionality of the corresponding components described above in conjunction with FIG. 13.

According to at least one example of the apparatus 1900, the processing circuit 1910 may include one or more of a module for receiving 1920, a module for applying artificial degradation 1922, a module for decoding 1924, a module for applying an integrity check 1926, and a module for transmitting 1928.

The module for receiving 1920 may include circuitry and/or programming (e.g., code for receiving 1930 stored on the storage medium 1904) adapted to perform several functions relating to, for example, receiving packet streams and/or other transmissions. Initially, the module for receiving 1920 obtains received data. For example, the module for receiving 1920 may obtain this data directly from a component of the apparatus (e.g., the receiver 1916 or some other component). In some implementations, the module for receiving 1920 processes (e.g., decodes) the received data. The module for receiving 1920 then outputs the received data (e.g., stores the data in the memory 1908 or sends the data to another component of the apparatus 1902).

The module for applying artificial degradation 1922 may include circuitry and/or programming (e.g., code for applying artificial degradation 1932 stored on the storage medium 1904) adapted to perform several functions relating to, for example, artificially degrading a packet stream. In some implementations, the module for applying artificial degradation 1922 obtains a packet stream, performs an artificial degradation operation (e.g., noise injection, puncturing, etc.) on the packet stream, and an outputs the artificially degraded packet stream.

The module for decoding 1924 may include circuitry and/or programming (e.g., code for decoding 1934 stored on the storage medium 1904) adapted to perform several functions relating to, for example, decoding a packet stream. In some implementations, the module for encoding 1924 obtains information to be decoded, decodes the information according to a designated decoding algorithm, and outputs decoded information.

The module for applying an integrity check 1926 may include circuitry and/or programming (e.g., code for applying an integrity check 1936 stored on the storage medium 1904) adapted to perform several functions relating to, for example, performing an integrity check operation on a decoded artificially degraded packet stream. In some implementations, the module for applying an integrity check 1926 obtains a packet stream, performs an integrity check (e.g., CRC) operation on the packet stream, and an outputs an indication of the success or failure of the integrity check.

The module for transmitting 1928 may include circuitry and/or programming (e.g., code for transmitting 1938 stored on the storage medium 1904) adapted to perform several functions relating to, for example, transmitting at least one response indicating success or failure of an integrity check. Initially, the module for transmitting 1928 obtains data to be transmitted. For example, the module for transmitting 1928 may obtain this data directly from a component of the apparatus (e.g., the memory 1908 or some other component). In some implementations, the module for transmitting 1928 processes (e.g., encodes) the data to be transmitted. The module for transmitting 1928 then causes the data to be transmitted. For example, the module for transmitting 1928 can pass the data to the transmitter 1914.

As mentioned above, programming stored by the storage medium 1904, when executed by the processing circuit 1910, causes the processing circuit 1910 to perform one or more of the various functions and/or process operations described herein. For example, the storage medium 1904 may include one or more of the code for receiving 1930, the code for applying artificial degradation 1932, the code for decoding 1934, the code for applying an integrity check 1936, and the code for transmitting 1938.

Figure 20:
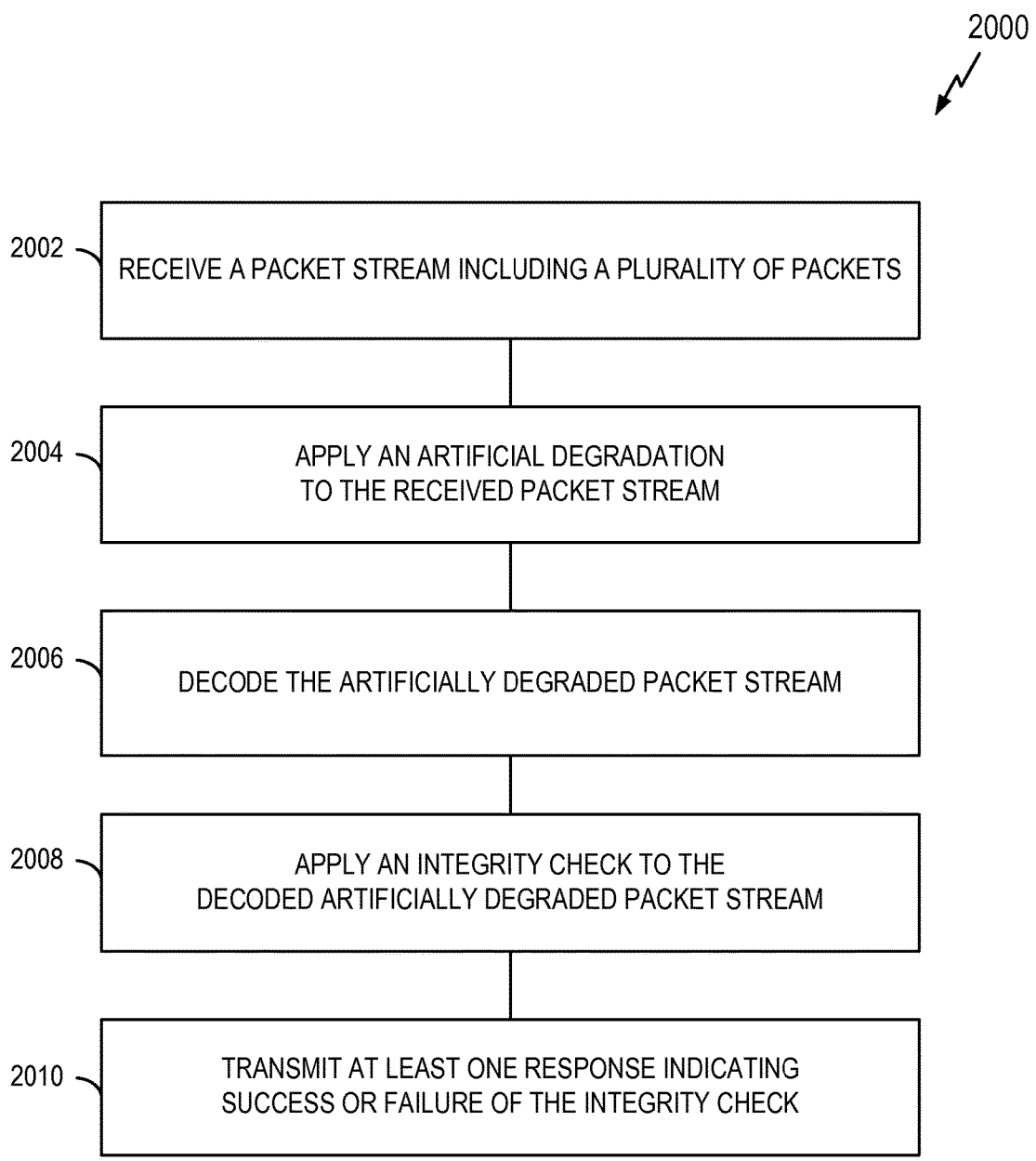
FIG. 20 is a flowchart illustrating an example of a process of implementing artificial degradation of a data stream in accordance with some aspects of the disclosure.

FIG. 20 illustrates a process 2000 for providing artificial degradation in accordance with some aspects of the disclosure. The process 2000 may take place within the processing circuit 1910 (FIG. 19), which may be located at an AP, a UE, or some other suitable apparatus. In another aspect, the process 2000 may be implemented by any of the UEs 130-140 or any of the APs 142-146 illustrated in FIG. 1. Of course, in various aspects within the scope of the present disclosure, the process 2000 may be implemented by any suitable apparatus capable of supporting rate control.

At block 2002, an apparatus receives a packet stream including a plurality of packets.

At block 2004, the apparatus applies an artificial degradation to the received packet stream. In some aspects, the application of the artificial degradation to the received packet stream comprises injecting noise into the received packet stream. In some aspects, the application of the artificial degradation to the received packet stream comprises puncturing symbols of the received packet stream. In some aspects, the application of the artificial degradation to the received packet stream comprises using degraded (e.g., limited) decoding to decode the received packet stream.

At block 2006, the apparatus decodes the artificially degraded packet stream.

At block 2008, the apparatus applies an integrity check to the decoded artificially degraded packet stream.

At block 2010, the apparatus transmits a response, indicating the success or failure of the integrity check. In some aspects, the transmitted at least one response may include a plurality of responses transmitted at a nominal feedback rate, where the nominal feedback rate is a higher rate than a nominal integrity check feedback rate associated with the received packet stream.

Figure 21:
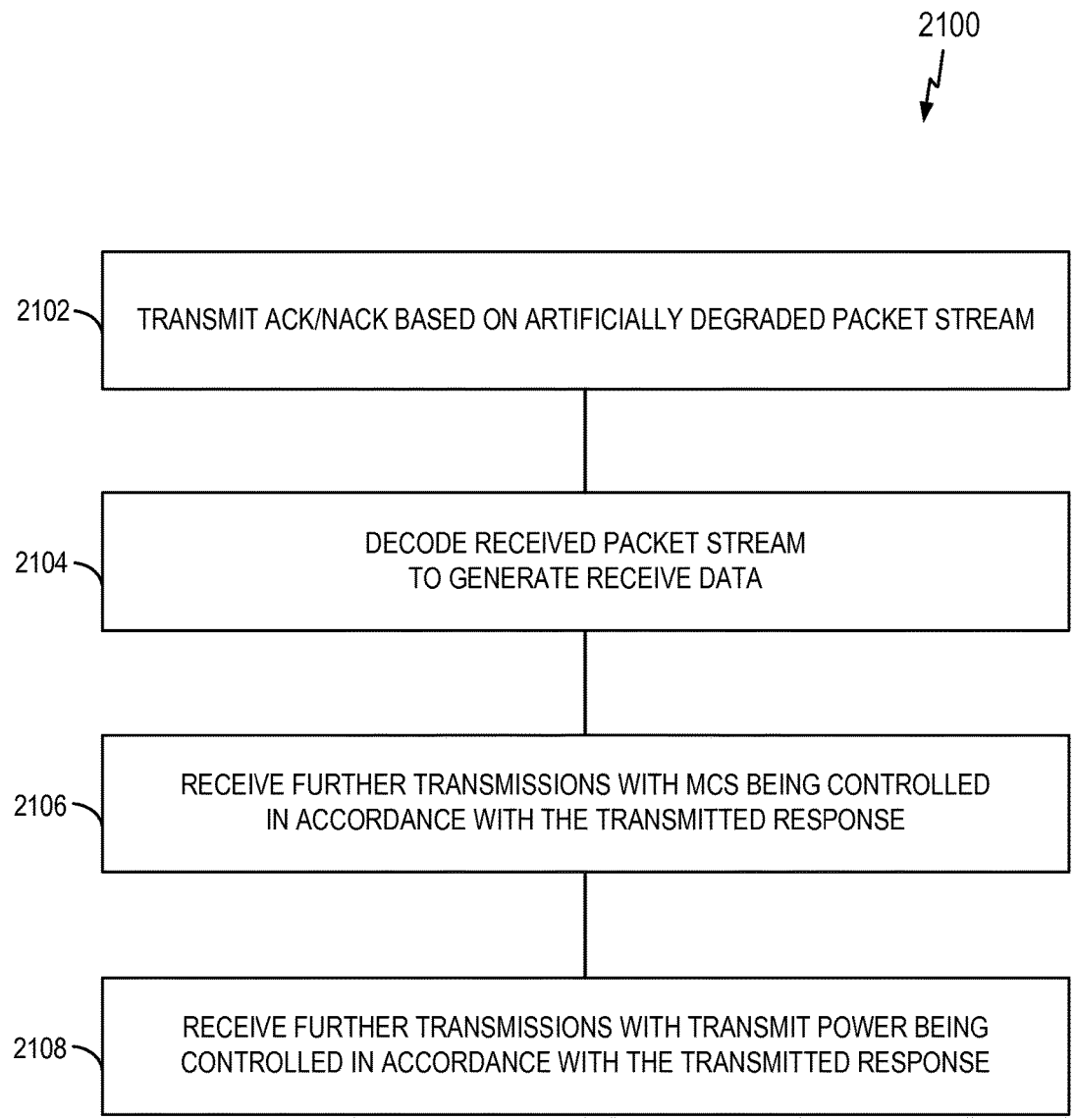
FIG. 21 is a flowchart illustrating additional aspects of a process of implementing artificial degradation of a data stream in accordance with some aspects of the disclosure.

FIG. 21 illustrates a process 2100 including additional aspects for providing artificial degradation in accordance with some aspects of the disclosure. The process 2100 may take place within the processing circuit 1310 (FIG. 13), which may be located at an AP, a UE, or some other suitable apparatus. In another aspect, the process 2100 may be implemented by any of the UEs 130-140 or any of the APs 142-146 illustrated in FIG. 1. Of course, in various aspects within the scope of the present disclosure, the process 2100 may be implemented by any suitable apparatus capable of supporting rate control.

At block 2102, the apparatus transmits and ACK/NACK based on an artificially degraded packet stream. For example, the operations of block 2102 may correspond to the operations of blocks 2002-2010 of FIG. 20. Thus, the coding rate of the link may be adapted based on this feedback.

At block 2104, the apparatus decodes the received packet stream to generate output data. In some aspects, the apparatus may decode the received packet stream to generate receive data associated with a nominal error rate that is lower than a nominal error rate associated with the artificially degraded packet stream. As discussed herein, the FER of the received packet stream may be improved due to the operations of block 2102.

At block 2106, the apparatus may receive further transmissions corresponding to the packet stream, a modulation and coding scheme of the further transmissions being controlled in accordance with the transmitted response. Thus, the MCS on the link may be further adapted based on the artificial feedback.

At block 2108, the apparatus the apparatus may receive further transmissions corresponding to the packet stream, a transmit power of the further transmissions being controlled in accordance with the transmitted response. Thus, the transmit power used on the link may be further adapted based on the artificial feedback.

Figure 22:
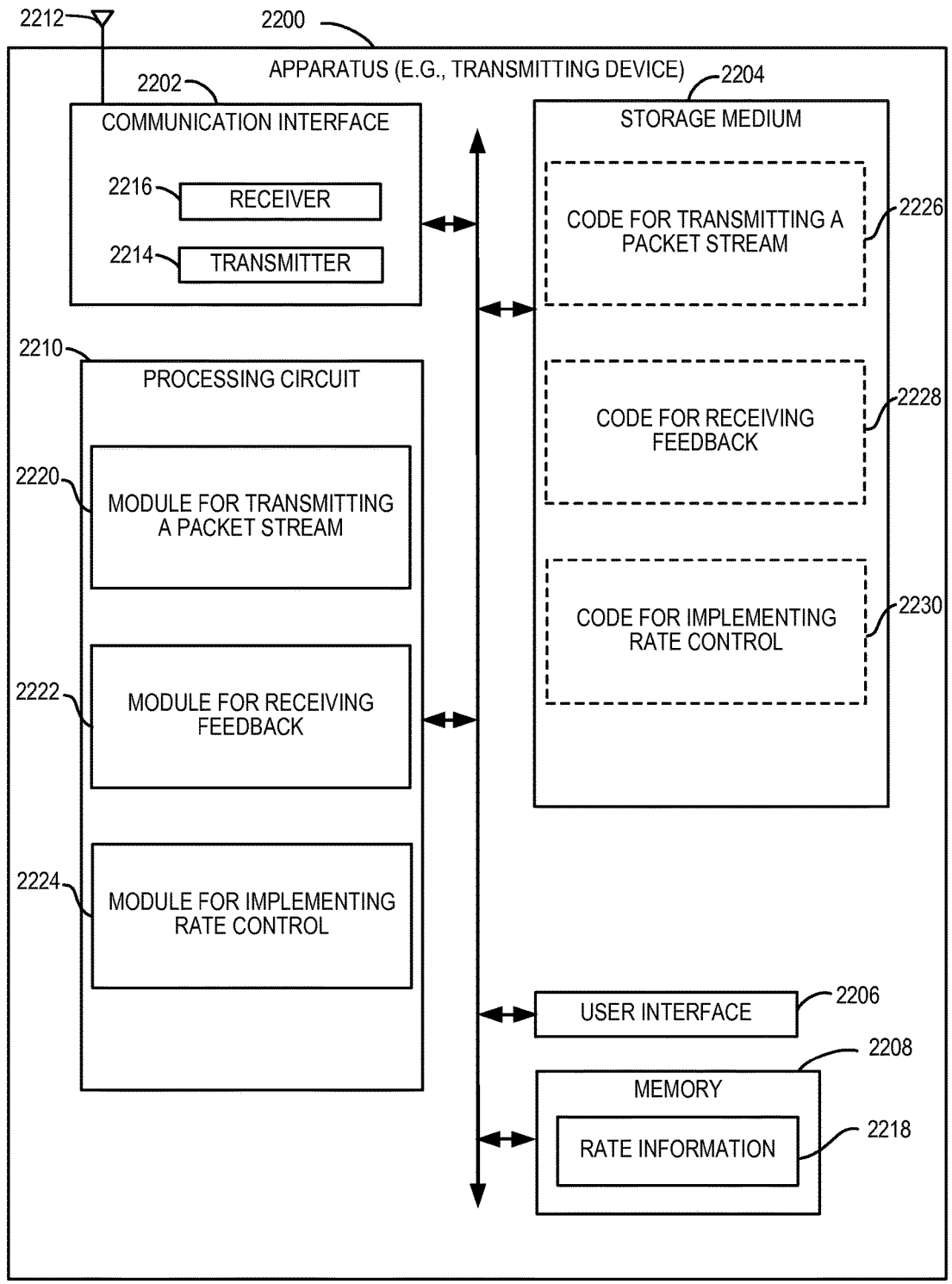
FIG. 22 is a block diagram illustrating select components of an apparatus configured to implement rate control based on feedback associated with artificial degradation of a data stream in accordance with some aspects of the disclosure.

FIG. 22 is an illustration of an apparatus 2200 (e.g., including transmitting device functionality) configured according to one or more aspects of the disclosure. The apparatus 2200 includes a communication interface (e.g., at least one transceiver) 2202, a storage medium 2204, a user interface 2206, a memory 2208, and a processing circuit 2210. The communication interface 2202 includes a transmitter 2214 and a receiver 2216. The memory 2208 may represent one or more memory devices. As indicated, the memory 2208 may maintain rate information 2218 along with other information used by the apparatus 2200. In some implementations, the memory 2208 and the storage medium 2204 are implemented as a common memory component.

The memory 2208 may also be used for storing data that is manipulated by the processing circuit 2210 or some other component of the apparatus 2200. The general functionality of these components is similar to the functionality of the corresponding components described above in conjunction with FIG. 13.

According to at least one example of the apparatus 2200, the processing circuit 2210 may include one or more of a module for transmitting a packet stream 2220, a module for receiving feedback 2222, and a module for implementing rate control 2224.

The module for transmitting a packet stream 2220 may include circuitry and/or programming (e.g., code for transmitting a packet stream 2226 stored on the storage medium 2204) adapted to perform several functions relating to, for example, transmitting packets on a wireless link. Initially, the module for transmitting a packet stream 2220 obtains data to be transmitted. For example, the module for transmitting a packet stream 2220 may obtain this data directly from a component of the apparatus (e.g., the memory 2208 or some other component). In some implementations, the module for transmitting a packet stream 2220 processes (e.g., encodes) the data to be transmitted. The module for transmitting a packet stream 2220 then causes the data to be transmitted. For example, the module for transmitting a packet stream 2220 can pass the data to the transmitter 2214.

The module for receiving feedback 2222 may include circuitry and/or programming (e.g., code for receiving feedback 2228 stored on the storage medium 2204) adapted to perform several functions relating to, for example, receiving feedback associated with a packet stream. Initially, the module for receiving feedback 2222 obtains received data. For example, the module for receiving feedback 2222 may obtain this data directly from a component of the apparatus (e.g., the receiver 2216 or some other component). In some implementations, the module for receiving feedback 2222 processes (e.g., decodes) the received data. The module for receiving feedback 2222 then outputs the received data (e.g., stores the data in the memory 2208 or sends the data to another component of the apparatus 2202).

The module for implementing rate control 2224 may include circuitry and/or programming (e.g., code for implementing rate control 2230 stored on the storage medium 2204) adapted to perform several functions relating to, for example, decoding a packet stream. In some implementations, the module for implementing rate control 2224 obtains information to be decoded, decodes the information according to a designated decoding algorithm, and outputs decoded information.

As mentioned above, programming stored by the storage medium 2204, when executed by the processing circuit 2210, causes the processing circuit 2210 to perform one or more of the various functions and/or process operations described herein. For example, the storage medium 2204 may include one or more of the code for transmitting a packet stream 2226, the code for receiving feedback 2228, and the code for implementing rate control 2230.

Figure 23:
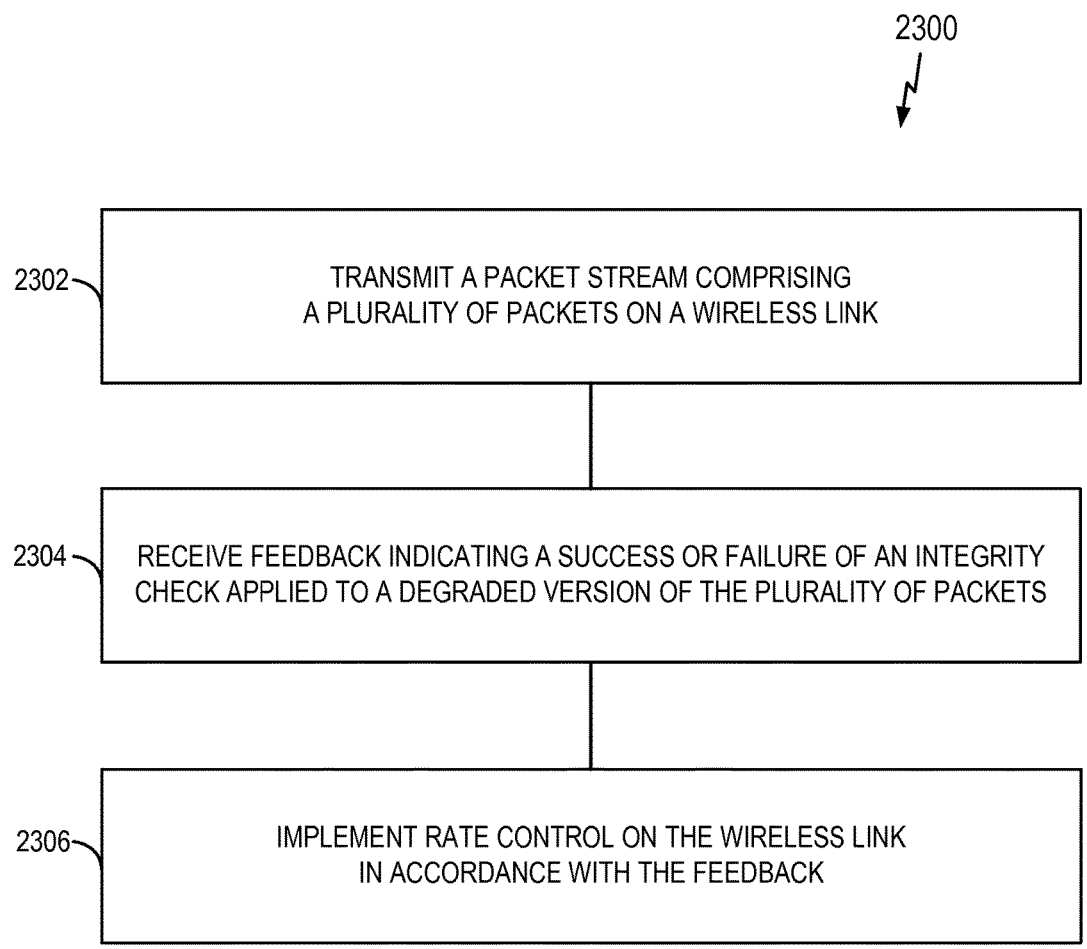
FIG. 23 is a flowchart illustrating an example of a process of rate control based on feedback associated with artificial degradation of a data stream in accordance with some aspects of the disclosure.

FIG. 23 illustrates a process 2300 for providing rate control based on artificial degradation feedback in accordance with some aspects of the disclosure. The process 2300 may take place within the processing circuit 2210 (FIG. 22), which may be located at an AP, a UE, or some other suitable apparatus. In another aspect, the process 2300 may be implemented by any of the UEs 130-140 or any of the APs 142-146 illustrated in FIG. 1. Of course, in various aspects within the scope of the present disclosure, the process 2300 may be implemented by any suitable apparatus capable of supporting rate control.

At block 2302, an apparatus transmits a packet stream including a plurality of packets on a wireless link. At block 2304, the apparatus receives feedback indicating a success or failure of an integrity check applied to a degraded version of the plurality of packets. At block 2306, the apparatus implements rate control in accordance with the feedback.

CONCLUSION

While the above discussed aspects, arrangements, and implementations are discussed with specific details and particularity, one or more of the components, operations, features and/or functions illustrated in one or more of FIG. 5, 7, 9, 10, 12, 14-16, 18, 20, 21, or 23 may be rearranged and/or combined into a single component, operation, feature or function or embodied in several components, operations, or functions. Additional elements, components, operations, and/or functions may also be added or not utilized without departing from the teachings herein. The apparatus, devices and/or components illustrated in one or more of FIG. 1, 2, 4, 8, 11, 13, 17, 19, or 22 may be configured to perform or employ one or more of the methods, features, parameters, or operations described in one or more of FIG. 5, 7, 9, 10, 12, 14-16, 18, 20, 21, or 23. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Those of skill in the art would further appreciate that the various illustrative logical blocks, modules, circuits, and algorithm operations described in connection with the aspects disclosed herein may be implemented as hardware, software, firmware, middleware, microcode, or any combination thereof. To clearly illustrate this interchangeability, various illustrative components, blocks, modules, circuits, and operations have been described above generally in terms of their functionality. Whether such functionality is implemented as hardware or software depends upon the particular application and design constraints imposed on the overall system.

The teachings herein may be incorporated into (e.g., implemented within or performed by) a variety of apparatuses. In some aspects, a wireless apparatus implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, a camera, a wearable computing device (e.g., a smartwatch, a health or fitness tracker, etc.), an appliance, a sensor, a vending machine, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, an apparatus (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless apparatus may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; a, b and c; $2a$, $2b$; and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The various features associated with the examples described herein and shown in the accompanying drawings can be implemented in different examples and implementations without departing from the scope of the present disclosure. Therefore, although certain specific constructions and arrangements have been described and shown in the accompanying drawings, such aspects are merely illustrative and not restrictive of the scope of the disclosure, since various other additions and modifications to, and deletions from, the described aspects will be apparent to one of ordinary skill in the art. Based on the teachings herein, one skilled in the art should appreciate that an aspect disclosed herein may be implemented independently of any other aspects and that two or more of these aspects may be combined in various ways.

Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims.

The above description is provided to enable any person skilled in the art to practice the various aspects described herein. Nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communication, comprising:
at least one communication interface configured to:
   transmit a first packet stream on a first link;
   transmit a second packet stream on a second link, the second packet stream comprising information that is redundant of information transmitted on the first packet stream;
   receive first feedback for the transmission of the first packet stream on the first link, the first feedback indicating success or failure of an integrity check of packets corresponding to the first packet stream; and
   receive second feedback for the transmission of the second packet stream on the second link, the second feedback indicating success or failure of an integrity check of packets corresponding to the second packet stream; and
at least one processor coupled to the communication interface and configured to:
   initiate a retransmission for the first packet stream if both the first feedback and the second feedback indicate a failure of a respective integrity check;
   implement a first rate control loop on the first link, wherein the first rate control loop comprises setting at least one of a modulation scheme, a coding scheme, or a transmission power, of the first link in accordance with the first feedback; and
   implement a second rate control loop on the second link, wherein the second rate control loop comprises setting at least one of a modulation scheme, a coding scheme, or a transmission power, of the second link in accordance with the second feedback,
   wherein the first rate control loop is independent of the second rate control loop and the second rate control loop is independent of the first rate control loop.

2. The apparatus of claim 1, wherein the information that is redundant of information transmitted on the first packet stream comprises duplicate packets to packets transmitted on the first packet stream.

3. The apparatus of claim 1, wherein the information that is redundant of information transmitted on the first packet stream comprises parity information for the information transmitted on the first packet stream.

4. The apparatus of claim 1, wherein the at least one processor is further configured to:
encode an initial packet stream; and
divide the encoded initial packet stream to generate the first packet stream and the second packet stream.

5. The apparatus of claim 1, wherein the at least one processor is further configured to:
retransmit packets for the first and second links at a first nominal rate,
wherein the first nominal rate is lower than a nominal packet failure rate on the first link and the first nominal rate is lower than a nominal packet failure rate on the second link.

6. The apparatus of claim 1, wherein:
the first link is transmitted over a first carrier frequency; and
the second link is transmitted over a second carrier frequency different from the first carrier frequency.

7. The apparatus of claim 1, wherein:
the first link is transmitted utilizing a first antenna; and
the second link is transmitted utilizing a second antenna different from the first antenna.

8. A method of wireless communication, comprising:
transmitting a first packet stream on a first link;
transmitting a second packet stream on a second link, the second packet stream comprising information that is redundant of information transmitted on the first packet stream;
receiving first feedback for the transmission of the first packet stream on the first link, the first feedback indicating success or failure of an integrity check of packets corresponding to the first packet stream;
receiving second feedback for the transmission of the second packet stream on the second link, the second feedback indicating success or failure of an integrity check of packets corresponding to the second packet stream;
initiating a retransmission for the first packet stream if both the first feedback and the second feedback indicate a failure of a respective integrity check;
implementing a first rate control loop on the first link, wherein the first rate control loop comprises setting at least one of a modulation scheme, a coding scheme, or a transmission power, of the first link in accordance with the first feedback; and
implementing a second rate control loop on the second link, wherein the second rate control loop comprises setting at least one of a modulation scheme, a coding scheme, or a transmission power, of the second link in accordance with the second feedback,
wherein the first rate control loop is independent of the second rate control loop and the second rate control loop is independent of the first rate control loop.

9. The method of claim 8, wherein the information that is redundant of information transmitted on the first packet stream comprises duplicate packets to packets transmitted on the first packet stream.

10. The method of claim 8, wherein the information that is redundant of information transmitted on the first packet stream comprises parity information for the information transmitted on the first packet stream.

11. The method of claim 8, further comprising:
encoding an initial packet stream; and
dividing the encoded initial packet stream to generate the first packet stream and the second packet stream.

12. The method of claim 8, further comprising:
retransmitting packets for the first and second links at a first nominal rate,
wherein the first nominal rate is lower than a nominal packet failure rate on the first link and the first nominal rate is lower than a nominal packet failure rate on the second link.

13. The method of claim 8, wherein:
the first link is transmitted over a first carrier frequency; and
the second link is transmitted over a second carrier frequency different from the first carrier frequency.

14. The method of claim 8, wherein
the first link is transmitted utilizing a first antenna; and
the second link is transmitted utilizing a second antenna different from the first antenna.

15. An apparatus for wireless communication, comprising:
means for transmitting a first packet stream on a first link;
means for transmitting a second packet stream on a second link, the second packet stream comprising information that is redundant of information transmitted on the first packet stream;
means for receiving first feedback for the transmission of the first packet stream on the first link, the first feedback indicating success or failure of an integrity check of packets corresponding to the first packet stream;
means for receiving second feedback for the transmission of the second packet stream on the second link, the second feedback indicating success or failure of an integrity check of packets corresponding to the second packet stream;
means for initiating a retransmission for the first packet stream if both the first feedback and the second feedback indicate a failure of a respective integrity check;
means for implementing a first rate control loop on the first link, wherein the first rate control loop comprises setting at least one of a modulation scheme, a coding scheme, or a transmission power, of the first link in accordance with the first feedback; and
means for implementing a second rate control loop on the second link,
wherein the second rate control loop comprises setting at least one of a modulation scheme, a coding scheme, or a transmission power, of the second link in accordance with the second feedback,
wherein the first rate control loop on the first link is independent of the second rate control loop on the second link and the second rate control loop on the second link is independent of the first rate control loop on the first link.

16. The apparatus of claim 15, wherein the information that is redundant of information transmitted on the first packet stream comprises duplicate packets to packets transmitted on the first packet stream.

17. The apparatus of claim 15, wherein the information that is redundant of information transmitted on the first packet stream comprises parity information for the information transmitted on the first packet stream.

18. The apparatus of claim 15, further comprising:
means for encoding an initial packet stream; and
means for dividing the encoded initial packet stream to generate the first packet stream and the second packet stream.

19. The apparatus of claim 15, further comprising:
means for retransmitting packets for the first and second links at a first nominal rate, wherein the first nominal rate is lower than a nominal packet failure rate on the first link and the first nominal rate is lower than a nominal packet failure rate on the second link.

20. A non-transitory computer-readable medium storing computer-executable code to, when executed by a computer:
transmit a first packet stream on a first link;
transmit a second packet stream on a second link, the second packet stream comprising information that is redundant of information transmitted on the first packet stream;
receive first feedback for the transmission of the first packet stream on the first link, the first feedback indicating success or failure of an integrity check of packets corresponding to the first packet stream;
receive second feedback for the transmission of the second packet stream on the second link, the second feedback indicating success or failure of an integrity check of packets corresponding to the second packet stream;
initiate a retransmission for the first packet stream if both the first feedback and the second feedback indicate a failure of a respective integrity check;
implement a first rate control loop on the first link, wherein the first rate control loop comprises setting at least one of a modulation scheme, a coding scheme, or a transmission power, of the first link in accordance with the first feedback; and
implement a second rate control loop on the second link, wherein the second rate control loop comprises setting at least one of a modulation scheme, a coding scheme, or a transmission power, of the second link in accordance with the second feedback,
wherein the first rate control loop on the first link is independent of the second rate control loop on the second link and the second rate control loop on the second link is independent of the first rate control loop on the first link.

\* \* \* \* \*